US008808775B2

(12) United States Patent
Novak et al.

(10) Patent No.: US 8,808,775 B2
(45) Date of Patent: Aug. 19, 2014

(54) METHOD AND APPARATUS FOR CARTRIDGE-BASED CARBONATION OF BEVERAGES

(75) Inventors: Thomas J. Novak, Stowe, VT (US); Ross Packard, South Burlington, VT (US); Peter Peterson, Waterbury, VT (US); Shawn Gulla, Grand Isle, VT (US)

(73) Assignee: Keurig Green Mountain, Inc., Waterbury, VT (US)

( * ) Notice: Subject to any disclaimer, the term of this patent is extended or adjusted under 35 U.S.C. 154(b) by 324 days.

(21) Appl. No.: 13/017,459

(22) Filed: Jan. 31, 2011

(65) Prior Publication Data

US 2011/0226343 A1    Sep. 22, 2011

Related U.S. Application Data

(60) Provisional application No. 61/337,184, filed on Feb. 1, 2010.

(51) Int. Cl.
*A23L 2/54* (2006.01)
*A23L 2/40* (2006.01)
*B65D 85/816* (2006.01)
*B01F 3/04* (2006.01)
*B01F 15/02* (2006.01)
*A47J 31/41* (2006.01)
*A47J 31/40* (2006.01)

(52) U.S. Cl.
CPC ............. *A47J 31/41* (2013.01); *B01F 3/04808* (2013.01); *A23L 2/54* (2013.01); *B01F 15/0205* (2013.01); *B01F 15/0206* (2013.01); *A47J 31/407* (2013.01); *Y10S 261/07* (2013.01)
USPC ........... 426/394; 426/477; 426/115; 426/519; 426/590; 426/425; 426/431; 261/DIG. 7

(58) Field of Classification Search
CPC .................. B01F 3/04808; B01F 2003/04893; B01F 2003/049; B01F 15/0205; B01F 15/0207; B01F 15/0206; B67D 1/0057; B67D 1/0078; B67D 1/008; B67D 1/04; B67D 1/0406; B67D 1/0418; B67D 1/0412; A47J 31/407; A47J 31/41; A47J 31/40; A47J 31/3623; A47J 31/329; A47J 31/3676; A47J 31/368; A23L 2/54; B65D 85/8043; B65D 85/816; B65D 85/804; B65D 65/46; B65D 2581/3049; B65D 85/808; B65B 29/02; B65B 29/06
USPC ............. 426/477, 474, 115, 79, 78, 425, 431, 426/519, 590; 261/DIG. 7; 99/295, 323.2; 141/105

See application file for complete search history.

(56) References Cited

U.S. PATENT DOCUMENTS 716,474 A    12/1902  Price
1,592,395 A *  7/1926  Sulzberger .................... 206/217
(Continued)

FOREIGN PATENT DOCUMENTS

DE    102007001609    7/2008
GB        1051012      12/1966
(Continued)

OTHER PUBLICATIONS

Invitation to Pay Additional Fees from the International Searching Authority for International Application No. PCT/US2012/049356, Mailed Nov. 27, 2012.

(Continued)

*Primary Examiner* — Viren Thakur
(74) *Attorney, Agent, or Firm* — Wolf, Greenfield & Sacks, P.C.

(57) ABSTRACT

Systems, methods and cartridges for carbonating a precursor liquid, such as water, to form a beverage. A carbon dioxide source can be provided in a cartridge which is used to generate carbon dioxide gas that is dissolved into the precursor liquid. A beverage medium, such as a powdered drink mix or liquid syrup, may be provided in the same, or a separate cartridge as the carbon dioxide source and mixed with the precursor liquid to form a beverage. The use of one or more cartridges for the carbon dioxide source and/or beverage medium may make for an easy to use and mess-free system for making carbonated beverages, e.g., in the consumer's home.

18 Claims, 4 Drawing Sheets

(56) References Cited

U.S. PATENT DOCUMENTS

| | | | |
|---|---|---|---|
| 1,889,111 A * | 11/1932 | Serr | 206/217 |
| 1,945,489 A | 1/1934 | Manley | |
| 2,072,350 A | 3/1937 | Welker | |
| 2,201,430 A | 5/1940 | Deibel | |
| 2,219,032 A | 10/1940 | Kantor | |
| 3,628,444 A | 12/1971 | Mazza | |
| 3,851,797 A | 12/1974 | Jacobs | |
| 3,888,998 A | 6/1975 | Sampson et al. | |
| 3,930,053 A | 12/1975 | Japikse et al. | |
| 4,007,134 A | 2/1977 | Liepa et al. | |
| 4,011,733 A | 3/1977 | Kuckens et al. | |
| 4,025,655 A | 5/1977 | Whyte et al. | |
| 4,040,342 A * | 8/1977 | Austin et al. | 99/323.1 |
| 4,110,255 A | 8/1978 | Liepa et al. | |
| 4,186,215 A | 1/1980 | Buchel | |
| 4,214,011 A | 7/1980 | Strube | |
| 4,316,409 A | 2/1982 | Adams et al. | |
| 4,355,735 A * | 10/1982 | Whorton et al. | 222/80 |
| 4,458,584 A | 7/1984 | Annese et al. | |
| 4,475,448 A | 10/1984 | Shoaf et al. | |
| 4,493,441 A | 1/1985 | Sedam et al. | |
| 4,520,950 A * | 6/1985 | Jeans | 222/129.1 |
| 4,636,337 A | 1/1987 | Guptal et al. | |
| 4,688,701 A * | 8/1987 | Sedam | 222/129.1 |
| 4,719,056 A * | 1/1988 | Scott | 261/80 |
| 4,804,112 A | 2/1989 | Jeans | |
| 4,808,346 A * | 2/1989 | Strenger | 261/18.1 |
| 4,826,695 A * | 5/1989 | Tanner | 426/77 |
| 4,839,107 A | 6/1989 | Rudick et al. | |
| 4,927,567 A | 5/1990 | Rudick | |
| 4,940,164 A * | 7/1990 | Hancock et al. | 222/66 |
| 4,967,936 A * | 11/1990 | Bingler | 222/129.4 |
| 5,011,700 A * | 4/1991 | Gustafson et al. | 426/477 |
| 5,021,219 A * | 6/1991 | Rudick et al. | 422/112 |
| 5,071,595 A * | 12/1991 | Burrows | 261/140.1 |
| 5,073,312 A | 12/1991 | Burrows | |
| 5,102,627 A * | 4/1992 | Plester | 422/112 |
| 5,115,956 A | 5/1992 | Kirschner et al. | |
| 5,124,088 A * | 6/1992 | Stumphauzer | 261/121.1 |
| 5,160,461 A | 11/1992 | Burrows | |
| 5,182,084 A | 1/1993 | Plester | |
| 5,188,257 A * | 2/1993 | Plester | 222/1 |
| 5,192,513 A | 3/1993 | Stumphauzer et al. | |
| 5,312,017 A | 5/1994 | Schroeder et al. | |
| 5,350,587 A | 9/1994 | Plester | |
| 5,510,060 A | 4/1996 | Knoll | |
| 5,553,749 A | 9/1996 | Oyler et al. | |
| 5,565,149 A | 10/1996 | Page et al. | |
| 5,611,937 A | 3/1997 | Jarocki | |
| 5,624,645 A * | 4/1997 | Malley | 422/266 |
| 5,992,685 A | 11/1999 | Credle, Jr. | |
| 6,138,995 A | 10/2000 | Page | |
| 6,182,949 B1 | 2/2001 | Mobbs | |
| 6,253,960 B1 | 7/2001 | Bilskie et al. | |
| 6,324,850 B1 | 12/2001 | Davis | |
| 6,712,342 B2 | 3/2004 | Bosko | |
| 7,094,434 B2 | 8/2006 | Gaonkar et al. | |
| 7,114,707 B2 | 10/2006 | Rona et al. | |
| 7,267,247 B1 | 9/2007 | Crunkleton, III et al. | |
| 7,288,276 B2 | 10/2007 | Rona et al. | |
| 7,407,154 B2 | 8/2008 | Sakakibara et al. | |
| 2003/0188540 A1 | 10/2003 | Van Winkle | |
| 2004/0134932 A1 | 7/2004 | Lobdell | |
| 2005/0029287 A1 | 2/2005 | Mobbs | |
| 2006/0000851 A1 | 1/2006 | Girard et al. | |
| 2008/0148948 A1 | 6/2008 | Evers et al. | |
| 2009/0282987 A1 | 11/2009 | MacMahon et al. | |
| 2009/0311384 A1 | 12/2009 | MacMahon et al. | |
| 2010/0133708 A1 | 6/2010 | Fischer et al. | |
| 2010/0139496 A1 | 6/2010 | Santoiemmo | |
| 2010/0154906 A1 * | 6/2010 | Skalski et al. | 137/565.11 |
| 2010/0251901 A1 | 10/2010 | Santoiemmo | |
| 2011/0020508 A1 | 1/2011 | Santoiemmo | |

FOREIGN PATENT DOCUMENTS

| | | |
|---|---|---|
| GB | 1143742 | 2/1969 |
| GB | 2038953 A | 7/1980 |
| GB | 2076628 | 12/1981 |
| GB | 2234187 | 1/1991 |
| JP | 2003231592 | 8/2003 |
| WO | WO 2008/115047 A1 | 9/2008 |
| WO | WO 2008124851 | 10/2008 |

OTHER PUBLICATIONS

Annex dated May 11, 2011, International Application No. PCT/US2011/023157.

* cited by examiner

METHOD AND APPARATUS FOR CARTRIDGE-BASED CARBONATION OF BEVERAGES

This application claims the benefit of U.S. Provisional application 61/337,184, filed Feb. 1, 2010.

BACKGROUND

These inventions relate to carbonating liquids for use in preparing a beverage. Systems for carbonating liquids and/or mixing liquids with a beverage medium to form a beverage are described in a wide variety of publications, including U.S. Pat. Nos. 4,025,655, 4,040,342; 4,636,337; 6,712,342 and 5,182,084; and PCT Publication WO 2008/124851.

SUMMARY OF INVENTION

Aspects of the invention relate to carbonating a precursor liquid, such as water, to form a beverage. In some embodiments, a carbon dioxide source can be provided in a cartridge which is used to generate carbon dioxide gas that is dissolved into the precursor liquid. A beverage medium, such as a powdered drink mix or liquid syrup, may be provided in the same, or a separate cartridge as the carbon dioxide source and mixed with the precursor liquid (either before or after carbonation) to form a beverage. The use of one or more cartridges for the carbon dioxide source and/or beverage medium may make for an easy to use and mess-free system for making carbonated beverages, e.g., in the consumer's home.

In one aspect of the invention, a beverage making system includes a beverage precursor liquid supply arranged to provide a precursor liquid, and a cartridge chamber arranged to hold first and second cartridge portions. The cartridge chamber may have a single cartridge receiving portion for receiving one or more cartridges, or may include a plurality of cartridge receiving portions that are separated from each other, e.g., for receiving two or more cartridges. If multiple receiving portions are provided, they may be opened and closed simultaneously or independently of each other. A first cartridge portion may be provided in the cartridge chamber where the first cartridge portion contains a carbon dioxide source arranged to emit carbon dioxide gas for use in carbonating the precursor liquid. In some embodiments, the carbon dioxide source may include a charged molecular sieve, such as a zeolite that is in solid form (e.g., pellets) and has adsorbed carbon dioxide, that releases carbon dioxide in the presence of water. A second cartridge portion may be provided in the cartridge chamber where the second cartridge portion contains a beverage medium arranged to be mixed with a liquid precursor to form a beverage. The system may be arranged to carbonate the precursor liquid using the carbon dioxide gas emitted by the first cartridge portion and to mix the beverage medium of the second cartridge portion with the precursor liquid. The precursor liquid may be carbonated in the first cartridge portion, or in one or more other areas (such as a reservoir or membrane carbonator) to which carbon dioxide is delivered. Mixing of the precursor liquid with beverage medium may occur before or after carbonation, and may occur in the second cartridge portion or in another location, such as a mixing chamber separate from the second cartridge portion.

The system may include a carbon dioxide activating fluid supply arranged to provide fluid to the cartridge chamber for contact with the carbon dioxide source to cause the carbon dioxide source to emit carbon dioxide gas. For example, the carbon dioxide activating fluid supply may be arranged to control an amount of fluid (such as water in liquid or vapor form) provided to the cartridge chamber to control an amount of carbon dioxide gas produced by the carbon dioxide source. This may allow the system to control a carbon dioxide gas pressure used to carbonate the precursor liquid. Thus, the cartridge chamber may be arranged to hold at least the first cartridge portion in the cartridge chamber under a pressure that is greater than an ambient pressure. A carbon dioxide gas supply may be arranged to conduct carbon dioxide gas emitted by the carbon dioxide source, under pressure greater than the ambient pressure, to beverage precursor liquid to carbonate the precursor liquid. The carbon dioxide may be conducted to a carbonation tank, a membrane contactor, or other suitable arrangement for carbonation. For example, the system may include a carbonator that includes a membrane that separates a liquid side from a gas side of the carbonator, where the carbon dioxide gas is provided to the gas side and the beverage precursor liquid supply provides precursor liquid to the liquid side such that carbon dioxide on the gas side is dissolved in the precursor liquid on the liquid side. A pump may move precursor liquid from a reservoir through the carbonator for subsequent discharge as a beverage, or the precursor liquid may be circulated back to the reservoir for one or more additional passes through the carbonator.

In some embodiments, the system may mix the beverage medium with precursor liquid to form a beverage such that none of the beverage contacts the carbon dioxide source. However, in other embodiments, the precursor liquid may contact the carbon dioxide source, e.g., where the liquid is passed through the first cartridge portion to be carbonated. The first and second cartridge portions may each be part of respective first and second cartridges that are distinct from each other, or the cartridge portions may be part of a single cartridge. If part of a single cartridge, the first and second cartridge portions may be separated from each other, e.g., by a permeable element such as a filter, or an impermeable element such as a wall of the cartridge that may or may not be frangible, burstable (such as by suitable pressure), piercable or otherwise breached to allow the first and second cartridge portions to communicate with each other. A cartridge associated with the first and second cartridge portions may be pierced while in the cartridge chamber to allow access to the first and second portions. For example, if the cartridge portions are in separate cartridges, the two cartridges may be pierced by closing of the cartridge chamber to allow fluid to be provided to and/or gas to exit from the first cartridge portion, and to allow the beverage medium to exit the second cartridge portion whether alone or with a mixed precursor liquid.

In some embodiments, the first and cartridge portions may each have a volume that is less than a volume of carbonated beverage to be formed using the cartridge portions. This can provide a significant advantage by allowing a user to form a relatively large volume beverage using a relative small volume cartridge or cartridges. For example, the system may be arranged to use the first and second cartridge portions over a period of time less than about 120 seconds to form a carbonated liquid having a volume of between 100-1000 ml and a carbonation level of about 2 to 4 volumes. Carbonation may occur at pressures between 20-50 psi, or more. The cartridge portions in this embodiment may have a volume of about 50 ml or less, reducing an amount of waste and/or adding to convenience of the system.

In another aspect of the invention, a method for forming a beverage includes providing first and second cartridge portions in a cartridge chamber where the first cartridge portion contains a carbon dioxide source arranged to emit carbon dioxide gas for use in carbonating a liquid, and the second cartridge portion contains a beverage medium arranged to be mixed with a liquid precursor to form a beverage. A fluid, such as water in liquid or vapor form, may be provided to the cartridge chamber to cause the carbon dioxide source to emit carbon dioxide, and a precursor liquid may be carbonated by dissolving at least a portion of the carbon dioxide emitted from the carbon dioxide source in the precursor liquid. The precursor liquid may be mixed with a beverage medium to produce a beverage, either before or after carbonation.

As noted above, the carbon dioxide source may be in solid form in the first cartridge portion, e.g., including a charged zeolite. An amount of fluid provided to the first cartridge portion may be controlled to control carbon dioxide gas production by the carbon dioxide source, e.g., to maintain a pressure of gas produced by the carbon dioxide source to be within a desired range above an ambient pressure. In one embodiment, the carbon dioxide source includes a charged zeolite, and an amount of fluid provided to the cartridge chamber is controlled so as to cause the charged zeolite to emit carbon dioxide over a period of at least 30 seconds or more.

Carbonation of the precursor liquid may include providing carbon dioxide gas to a reservoir that contains precursor liquid, providing carbon dioxide to a gas side of a membrane such that carbon dioxide on the gas side is dissolved in the precursor liquid on a liquid side of the membrane, spraying precursor liquid in a carbon dioxide-filled space, passing the precursor liquid through the first cartridge portion under pressure, and so on.

As mentioned above, the first and second cartridge portions may each be part of respective first and second cartridges that are distinct from each other, or the cartridge portions may be part of a single cartridge. If part of a single cartridge, the first and second cartridge portions may be separated from each other, e.g., by a cartridge wall. Mixing of the precursor liquid may occur before or after carbonation, and may occur in the second cartridge portion or in another location, such as a mixing chamber separate from the second cartridge portion.

In one embodiment, the steps of providing a fluid and carbonating may be performed over a period of time less than about 120 seconds (e.g., about 60 seconds) and using a gas pressure of 20-50 psi to form a carbonated liquid having a volume of between 100-1000 ml (e.g., about 500 ml) and a carbonation level of about 2 to 4 volumes. Thus, systems and methods according to this aspect may produce a relatively highly carbonated beverage is a relatively short period of time, and without requiring high pressures.

In another aspect of the invention, a beverage making system includes a beverage precursor liquid supply for providing a precursor liquid, a cartridge chamber arranged to hold a cartridge, and a cartridge including an internal space containing a carbon dioxide source. The carbon dioxide source may be arranged to emit carbon dioxide gas for use in carbonating the precursor liquid, e.g., in response to contact with a fluid, such as water or other activating agent. A carbon dioxide activating fluid supply may be arranged to provide fluid to the cartridge chamber for contact with the carbon dioxide source to cause the carbon dioxide source to emit carbon dioxide gas, and the activating fluid supply may be arranged to control an amount of fluid provided to the cartridge chamber to control an amount of carbon dioxide gas emitted by the carbon dioxide source, e.g., to control a pressure in the cartridge chamber or other area. A carbon dioxide gas supply may be arranged to conduct carbon dioxide gas emitted by the carbon dioxide source, under pressure greater than the ambient pressure, to precursor liquid provided via the beverage precursor liquid supply to carbonate the precursor liquid. The ability to control carbon dioxide gas production, and thus pressure, in a relatively simple way of controlling fluid flow into the cartridge chamber, may provide advantages of a simple control and system operation.

The beverage precursor liquid supply may include a reservoir that contains precursor liquid, a carbonator that includes a membrane that separates a liquid side from a gas side of the carbonator, a pump that moves precursor liquid from the reservoir through the carbonator or other portion of the system, one or more filters or other liquid treatment devices, and so on. The cartridge chamber may be arranged to hold the cartridge in the chamber under a pressure that is greater than an ambient pressure, e.g., within a pressure range that is suitable for carbonating the precursor liquid. In some embodiments, gas pressure used for carbonation may be between about 20 and 50 psi, although higher (and lower) pressures are possible.

In another aspect of the invention, a method for forming a beverage includes providing a cartridge having an internal space that is sealed to enclose a carbon dioxide source in the internal space, providing fluid to the cartridge to cause the carbon dioxide source to emit carbon dioxide, controlling an amount of fluid provided to the cartridge over a period of time to control an amount of carbon dioxide gas emitted by the carbon dioxide source during the period of time, and carbonating a precursor liquid by dissolving at least a portion of the carbon dioxide emitted from the carbon dioxide source in the precursor liquid. The precursor liquid may be mixed with a beverage medium to produce a beverage, either before or after carbonation, whether in a cartridge or other area. In one embodiment, the cartridge may be pierced using a beverage making machine to provide liquid to the cartridge. As with the embodiments above, the liquid may be carbonated in the cartridge or other area, such as a carbonator or reservoir, the cartridge may include a second portion that includes the beverage medium (or a second cartridge may be used with the beverage medium), and so on.

In another aspect of the invention, a method for forming a carbonated beverage includes providing a cartridge having an internal space that is sealed to enclose a carbon dioxide source in the internal space where the carbon dioxide source is in solid form, opening the cartridge (such as by piercing) and causing the carbon dioxide source to emit carbon dioxide, and carbonating a liquid by dissolving at least a portion of the carbon dioxide emitted from the carbon dioxide source in the liquid. The liquid may be mixed with a beverage medium by passing the liquid through a cartridge chamber that contains the beverage medium to produce a beverage. By mixing the liquid with beverage medium in a cartridge, the need for a separate mixing chamber may be avoided, and flavor contamination between consecutively made beverages may be reduced (because the cartridge serves as the mixing chamber and is used only once).

In one embodiment, the cartridge that encloses the carbon dioxide source also includes the cartridge chamber that contains the beverage medium. For example, liquid may be introduced into a first portion of the cartridge where the carbon dioxide source is located for carbonation, and pass from the first portion to a second portion where the beverage medium is located. In another embodiment, the cartridge chamber where liquid is mixed with beverage medium may be part of a second cartridge separate from the cartridge that encloses the carbon dioxide source.

Carbon dioxide gas from the cartridge may be routed to an area where the carbon dioxide gas is dissolved in the liquid, e.g., to a membrane contactor, a reservoir that holds a substantial portion of the liquid, or other arrangement. A pressure of the carbon dioxide may be controlled by controlling an amount of fluid provided to the cartridge. As with other aspects of the invention, various embodiments and optional features described herein may be used with this aspect of the invention.

In another aspect of the invention, a kit for forming a beverage includes a first cartridge having an internal space that is sealed and contains a carbon dioxide source in the internal space. The carbon dioxide source may be in solid form and arranged to emit carbon dioxide gas for use in carbonating a precursor liquid. The first cartridge may be arranged to have an inlet through which fluid is provided to activate the carbon dioxide source and an outlet through which carbon dioxide gas exits the first cartridge. For example, the first cartridge may be pierced to form the inlet and outlet, or the first cartridge may have a defined inlet/outlet. A second cartridge of the kit may include an internal space that is sealed and contains a beverage medium for use in mixing with the precursor liquid to form a beverage. The second cartridge may be arranged to mix a precursor liquid with the beverage medium in the second cartridge, and thus may be pierceable or otherwise arranged to allow inlet of liquid and outlet of mixed liquid/beverage medium. The first and second cartridges may each have a volume that is less than a volume of beverage to be formed using the first and second cartridges, e.g., the cartridge may have a volume of about 50 ml and be used to make a beverage having a volume of about 500 ml. The first and second cartridges may be joined together, e.g., such that the cartridges cannot be separated from each other, without use of tools, without damaging at least a portion of the first or second cartridge. In one embodiment, the first and second cartridges may be joined by a welded joint or by interlocking mechanical fasteners.

In another aspect of the invention, a cartridge for forming a beverage includes a container having an internal space that is sealed and contains a carbon dioxide source in the internal space. The carbon dioxide source may be in solid form (such as a charged zeolite or other molecular sieve) and arranged to emit carbon dioxide gas for use in carbonating a precursor liquid. The container may be arranged to have an inlet through which fluid is provided to activate the carbon dioxide source and an outlet through which carbon dioxide gas exits the container for use in carbonating the precursor liquid. In one embodiment, the container may be pierceable by a beverage making machine to form the inlet and to form the outlet, e.g., at the top, bottom, side and/or other locations of the cartridge. In one arrangement, the container may include a lid that is pierceable by a beverage machine to form both the inlet and outlet. The container may have at least one portion that is semi-rigid or flexible, e.g., that is not suitable to withstand a pressure over about 80 psi inside the cartridge without physical support. The container may include a second chamber that contains a beverage medium for use in flavoring the precursor liquid to form a beverage, and the second chamber may be isolated from a first chamber in which the carbon dioxide source is contained. The container may have a volume that is less than a volume of carbonated beverage to be formed using the cartridge.

In another aspect of the invention, a beverage making system includes a cartridge chamber arranged to hold a cartridge under a pressure that is greater than an ambient pressure, and a cartridge including an internal space containing a carbon dioxide source arranged to emit carbon dioxide gas for use in carbonating a liquid. The cartridge may have a volume that is less than a volume of beverage to be created using the cartridge, e.g., a volume of 50 ml or less for use in carbonating a volume of liquid of about 100-1000 ml to a carbonation level of about 2 to 4 volumes. A beverage precursor liquid supply may provide precursor liquid into the internal space of the cartridge to cause the carbon dioxide source to emit carbon dioxide gas and cause at least some of the carbon dioxide gas to be dissolved in the precursor liquid while in the internal space. Carbonating the liquid in a cartridge chamber can simplify system operation, e.g., by eliminating the need for carbonation tanks or other carbonators. Instead, the cartridge may function as a carbonator, at least in part. In one embodiment, the cartridge includes a second chamber that contains a beverage medium for use in mixing with the precursor liquid to form a beverage. The second chamber may be isolated from a first chamber in which the carbon dioxide source is contained, or the first and second chamber may communicate, e.g., liquid may be introduced into the first chamber to be carbonated and pass from the first chamber to the second chamber where the beverage medium is located.

In another aspect of the invention, a method for forming a beverage includes providing a cartridge having an internal space that is sealed to enclose a carbon dioxide source in the internal space where the cartridge has a volume that is less than a volume of beverage to be created using the cartridge. Liquid may be provided into the cartridge to cause the carbon dioxide source to emit carbon dioxide, and the liquid may be carbonated by dissolving at least a portion of the carbon dioxide emitted from the carbon dioxide source in the liquid while the liquid is in the cartridge. The liquid may be mixed with a beverage medium to produce a beverage, either before or after carbonation in the cartridge. In fact, the cartridge may include a second chamber that contains a beverage medium for use in mixing with the precursor liquid to form a beverage, and the cartridge may have a volume that is less than a beverage to be made using the cartridge. The cartridge may be pierced using a beverage making machine to form an inlet and an outlet.

In another aspect of the invention, a beverage making system includes a beverage precursor liquid supply, a cartridge chamber arranged to hold a cartridge in a chamber, and a cartridge including an internal space containing a carbon dioxide source that is in solid form and is arranged to emit carbon dioxide gas for use in carbonating a liquid. A carbon dioxide activating fluid supply may provide liquid to the cartridge chamber for contact with the carbon dioxide source to cause the carbon dioxide source to emit carbon dioxide gas. The system may also include a carbonator that has a membrane that separates a liquid side from a gas side, where the carbon dioxide gas emitted by the cartridge is provided to the gas side and the beverage precursor liquid supply provides precursor liquid to the liquid side such that carbon dioxide on the gas side is dissolved in the precursor liquid on the liquid side. The cartridge chamber may be arranged to hold the cartridge in the chamber under a pressure that is greater than an ambient pressure, e.g., within a pressure range used to carbonate the liquid in the carbonator. A carbon dioxide gas supply may be arranged to conduct carbon dioxide gas emitted by the carbon dioxide source, under pressure greater than the ambient pressure, from the cartridge chamber to the gas side of the carbonator. The membrane of the carbonator may include a plurality of hollow fibers where an interior of the hollow fibers is part of the liquid side and an exterior of the hollow fibers is part of the gas side.

In another aspect of the invention, a method for forming a beverage includes providing a cartridge having an internal space that is sealed to enclose a carbon dioxide source in the internal space that is in solid form and arranged to emit carbon dioxide gas, opening the cartridge (such as by piercing) and causing the cartridge to emit carbon dioxide gas, and carbonating the liquid by dissolving at least a portion of the carbon dioxide gas emitted from the carbon dioxide source in a liquid. The carbon dioxide gas may be located on a gas side of a membrane and the liquid being located on a liquid side of the membrane. The membrane may be formed by a plurality of hollow fibers where the liquid side is located at an interior of the fibers and the gas side is at an exterior of the fibers. A gas pressure at the gas side may be controlled based on controlling an amount of liquid provided to the cartridge.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

Figure 1:
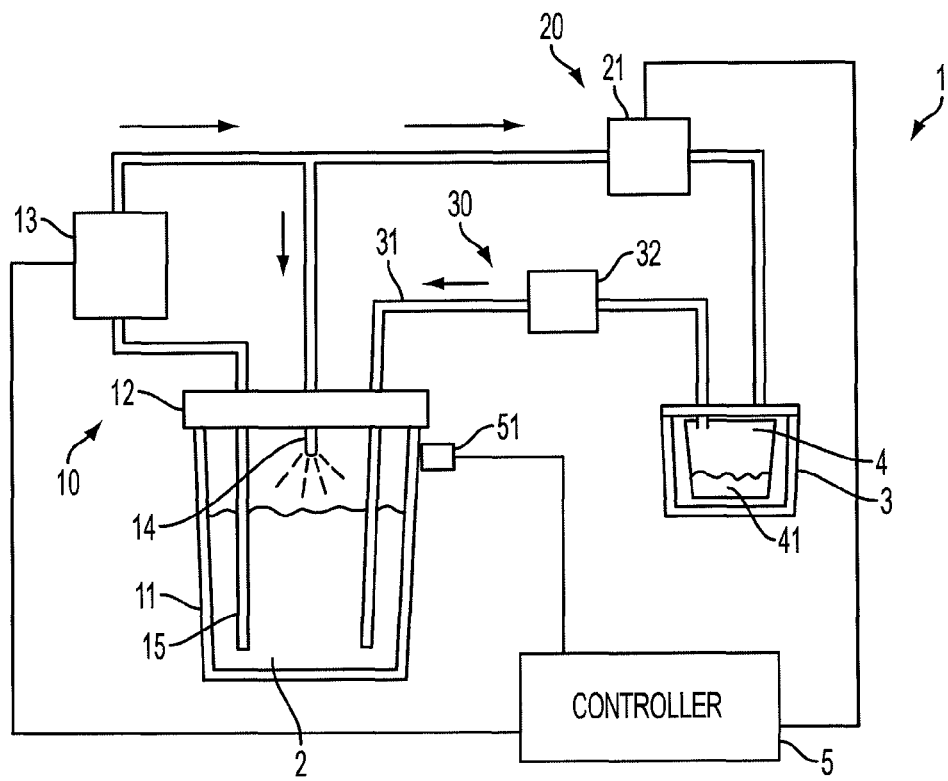
FIG. 1 shows a illustrative embodiment of a beverage making system having a removable reservoir.

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

In accordance with one aspect of the invention, a fluid (such as water, water vapor, or other) may be provided to a carbon dioxide source in a cartridge so as to cause the carbon dioxide source to emit carbon dioxide gas that is used to carbonate a liquid. In one embodiment, beverage forming machine may include a carbon dioxide activating fluid supply arranged to provide fluid to a cartridge chamber for contact with the carbon dioxide source so as to cause the carbon dioxide source to emit carbon dioxide gas. A carbon dioxide gas supply of the machine may be arranged to conduct carbon dioxide gas emitted by the carbon dioxide source, under pressure greater than the ambient pressure, to a precursor liquid to carbonate the precursor liquid. In some embodiments, the carbon dioxide source may be in solid form, such as a zeolite, activated carbon or other molecular sieve that is charged with carbon dioxide, and the use of a cartridge may not only isolate the carbon dioxide source from activating agents (such as water vapor in the case of a charged zeolite), but also potentially eliminate the need for a user to touch or otherwise directly handle the carbon dioxide source.

Having a carbon dioxide activating fluid supply may enable the use of another aspect of the invention, i.e., a volume or other measure of the fluid provided to the cartridge may be controlled to control the rate or amount of carbon dioxide that produced by the carbon dioxide source. This feature can make the use of some carbon dioxide sources, such as a charged zeolite material, possible. For example, zeolites charged with carbon dioxide tend to release carbon dioxide very rapidly and in relatively large quantities (e.g., a 30 gram mass of charged zeolite can easily produce 1-2 liters of carbon dioxide gas at atmospheric pressure in a few seconds in the presence of less than 30-50 ml of water). This rapid release can in some circumstances make the use of zeolites impractical for producing relatively highly carbonated liquids, such as a carbonated water that is carbonated to a level of 2 volumes or more. (A carbonation "volume" refers to the number of volume measures of carbon dioxide gas that is dissolved in a given volume measure of liquid. For example, a 1 liter amount of "2 volume" carbonated water includes a 1 liter volume of water that has 2 liters of carbon dioxide gas dissolved in it. Similarly, a 1 liter amount of "4 volume" carbonated water includes a 1 liter volume of water that has 4 liters of carbon dioxide dissolved in it. The gas volume measure is the gas volume that could be released from the carbonated liquid at atmospheric or ambient pressure and room temperature.) That is, dissolution of carbon dioxide or other gases in liquids typically takes a certain amount of time, and the rate of dissolution can only be increased a limited amount under less than extreme conditions, such as pressures within about 150 psi of ambient and temperatures within about +/−40 to 50 degrees C. of room temperature. By controlling the rate of carbon dioxide production for a carbon dioxide source, the total time over which the carbon dioxide source emits carbon dioxide can be extended, allowing time for the carbon dioxide to be dissolved without requiring relatively high pressures. For example, when employing one illustrative embodiment incorporating one or more aspects of the invention, the inventors have produced liquids having at least up to about 3.5 volume carbonation levels in less than 60 seconds, at pressures under about 40 psi, and at temperatures around 0 degrees Celsius. This capability allows for a carbonated beverage machine to operate at relatively modest temperatures and pressures, potentially eliminating the need for relatively expensive high pressure tanks, conduits and other components, as well as extensive pressure releases, containment structures and other safety features that might otherwise be required, particularly for a machine to be used in the consumer's home.

In another aspect of the invention, a portion of a precursor liquid that is used to form a beverage may be used to activate the carbon dioxide source. This feature may help simplify operation of a beverage making machine, e.g., by eliminating the need for special activation substances. As a result, a beverage making machine, or a method of forming a beverage, may be made less expensively and/or without special purpose ingredients. For example, in the case of a machine making carbonated water, all that is needed to activate the carbon dioxide source may be a portion of the water used to form the beverage. It should be understood, however, that other aspects of the invention need not require the use of a portion of precursor liquid to activate a carbon dioxide source, and instead may use any suitable activating agent, such as a citric acid in aqueous form that is added to a bicarbonate material. For example, the cartridge that includes the carbon dioxide source may include (as part of the source), an activating agent whose addition to another component of the carbon dioxide source is controlled to control carbon dioxide production.

FIG. 1 shows one illustrative embodiment that incorporates at least the aspects of providing a fluid to a cartridge and/or cartridge chamber to activate a carbon dioxide source, as well as controlling the fluid flow to control carbon dioxide production, and the use of a portion of beverage precursor liquid to activate a carbon dioxide source. The beverage making system 1 of FIG. 1 includes a beverage precursor liquid 2 that is contained in a reservoir 11. The beverage precursor liquid 2 can be any suitable liquid, including water (e.g., flavored or otherwise treated water, such as sweetened, filtered, deionized, softened, carbonated, etc.), or any other suitable liquid used to form a beverage, such as milk, juice, coffee, tea, etc. (whether heated or cooled relative to room temperature or not). The reservoir 11 is part of a beverage precursor supply 10, which also includes a lid 12 that engages with the reservoir 11 to form a sealed enclosure, a pump 13 to circulate the precursor liquid 2, and a nozzle, showerhead or other component 14 that serves to disperse the precursor liquid 2 in a headspace in the reservoir 11. Of course, the precursor supply 10 may be arranged in other ways, e.g., to include additional or different components. For example, the reservoir 11 and lid 12 may be replaced with a closed tank that has suitable inlet/outlet ports, the pump 13 and/or nozzle 14 may be eliminated, and or other changes.

In this embodiment, the reservoir 11 is initially provided with the precursor liquid 2 by a user, who provides the liquid 2 in the reservoir 11, e.g., from a water tap or other source. The user may also provide ice or other cooling medium in the reservoir 11 as desired, so as to cool the ultimate beverage made. In other embodiments, the system 1 may include a refrigeration system or other cooling system (such as that found in refrigerators, air conditioning units, thermoelectric cooling units, or other devices used to remove heat from a material) to cool the liquid 2. In some arrangements, cooling the precursor liquid 2 may help the carbonation process, e.g., because cooler liquids tend to dissolve carbon dioxide or other gas more rapidly and/or are capable of dissolving larger amounts of gas. However, in one aspect of the invention, a carbonated liquid may be cooled after the carbonation process is complete, e.g., just before discharge using a flow through chiller. This feature may allow the system 1 to chill only the beverage, and not other portions of the system, such as the reservoir 11, carbonator, pump, etc., reducing the heat output by the system 1. Although a user initially provides the beverage precursor liquid 2 in the reservoir 11, the precursor supply 10 may include other components to provide liquid 2 to the reservoir 11, such as a plumbed water line, controllable valve, and liquid level sensor to automatically fill the reservoir 11 to a desired level, a second water reservoir or other tank that is fluidly connected to the reservoir 11 (e.g., such as a removable water tank found with some coffee making machines along with a pump and conduit to route water from the removable tank to the reservoir 11), and other arrangements.

The beverage making system 1 also includes a carbon dioxide activating fluid supply 20 that provides a fluid to a cartridge 4 so as to activate a carbon dioxide source 41 to release carbon dioxide gas. In this embodiment, the carbon dioxide source 41 is located in a portion of the cartridge 4 and includes a charged adsorbent or molecular sieve, e.g., a zeolite material that has adsorbed some amount of carbon dioxide gas that is released in the presence of water, whether in vapor or liquid form. Of course, other carbon dioxide source materials may be used, such as charcoal or other molecular sieve materials, or source materials that generate carbon dioxide by chemical means, such as sodium bicarbonate and citric acid (with the addition of water if the bicarbonate and acid are initially in dry form), or others. In addition, aspects of the invention are not necessarily limited to use with carbon dioxide gas, but may be used with any suitable gas, such as nitrogen, which is dissolved in some beers or other beverages. In one embodiment, the charged adsorbent is a zeolite such as analcime, chabazite, clinoptilolite, heulandite, natrolite, phillipsite, or stilbite. The zeolite may be naturally occurring or synthetic, and may be capable of holding up to about 20% carbon dioxide by weight or more. The zeolite material may be arranged in any suitable form, such as a solid block (e.g., in disc form), particles of spherical, cubic, irregular or other suitable shape, and others. An arrangement that allows the zeolite to flow or be flowable, e.g., spherical particles, may be useful for packaging the zeolite in individual cartridges. Such an arrangement may allow the zeolite to flow from a hopper into a cartridge container, for example, simplifying the manufacturing process. The surface area of the zeolite particles may also be arranged to help control the rate at which the zeolite releases carbon dioxide gas, since higher surface area measures typically increase the gas production rate. Generally, zeolite materials will release adsorbed carbon dioxide in the presence of water in liquid or vapor form, allowing the zeolite to be activated to release carbon dioxide gas by the addition of liquid water to the zeolite.

The carbon dioxide activating fluid supply 20 in this embodiment includes a conduit that is fluidly coupled to the pump 13 and a valve 21 that can be controlled to open/close or otherwise control the flow of precursor liquid 2 into the cartridge 4. As can be seen, circulation of the liquid 2 by the pump 13 can allow the activating fluid supply 20 to divert some (e.g., a first portion) of the precursor liquid 2 to the cartridge chamber 3 to cause the creation of carbon dioxide gas, e.g., by opening the valve 21. Other arrangements or additions are possible for the carbon dioxide activating fluid supply 20, such as a suitably sized orifice in the conduit leading from the pump 13 outlet to the cartridge 4, a pressure-reducing element in the conduit, a flow-restrictor in the conduit, a flow meter to indicate an amount and/or flow rate of liquid into the cartridge 4, and so on. In addition the liquid source 20 need not use precursor liquid 2 to activate the carbon dioxide source 41, but instead may use a dedicated source of fluid for activation. For example, the carbon dioxide activating fluid supply 20 may include a syringe, piston pump or other positive displacement device that can meter desired amounts of liquid (whether water, citric acid or other material) that are delivered to the cartridge 4. In another embodiment, the activating fluid supply 20 may include a gravity fed liquid supply that has a controllable delivery rate, e.g., like the drip-type liquid supply systems used with intravenous lines for providing liquids to hospital patients, or may spray atomized water or other liquid to provide a water vapor or other gas phase activating fluid to the cartridge 4. Moreover, although FIG. 1 suggests that the activating fluid supply 20 provides liquid to a top of the cartridge 4, the liquid source 20 may provide the fluid to a bottom of the cartridge 4, e.g., to flood the bottom of the cartridge, or other suitable location. It is also conceivable that an activating liquid can be provided in the cartridge with the carbon dioxide source 42, e.g., in a chamber that is pierced to allow contact of the liquid with the source 42.

In accordance with one embodiment, the cartridge 4 (having one or more portions) may be located in a cartridge chamber 3 during carbon dioxide production. As a result, the cartridge 4 may be made of a relatively flexible material or otherwise constructed so that the cartridge 4 cannot withstand a relatively high pressure gradient between the interior and exterior of the cartridge 4. That is, the cartridge chamber 3 may contain any pressure generated by the carbon dioxide source 41 and support the cartridge 4 as necessary. In this illustrative embodiment, the cartridge 4 is contained in a closed and sealed chamber 3 that has a space or gap surrounding all or most of the cartridge 4. The pressure between the interior space of the cartridge 4 and the exterior of the cartridge 4 is allowed to equalize, e.g., by allowing some of the gas emitted by the carbon dioxide source 41 to "leak" into the space around the cartridge 4, and so even if the cartridge 4 is made of a relatively semi-rigid, flexible or weak material, the cartridge 4 will not burst or collapse. In alternate arrangements, the cartridge 4 may be made to fit a receiving space in the cartridge chamber 3 so that the chamber 3 supports the cartridge 4 when pressure is built up inside the cartridge 4. This support may be suitable to prevent the cartridge 4 from bursting or otherwise preventing the cartridge 4 from functioning as desired. In yet other embodiments, the cartridge 4 may be made suitably robust (either in whole or in part) so as to withstand relatively high pressures (e.g., 1 atm or more) in the cartridge interior space. In such a case, the cartridge chamber 3 need not function as much more than a physical support to hold the cartridge 4 in place or otherwise establish a connection to the cartridge for gas output by the cartridge 4 and/or liquid supply to the cartridge 4. In another embodiment, the cartridge may be mechanically robust enough to withstand pressures up to 90 psig, e.g., like a conventional carbonated soft drink can.

A carbon dioxide gas supply 30 may be arranged to provide carbon dioxide gas from the cartridge chamber 3 to an area where the gas is used to carbonate the liquid 2. The gas supply 30 may be arranged in any suitable way, and in this illustrative embodiment includes a conduit 31 that is fluidly connected between the cartridge chamber 3 and the reservoir 11, and a filter 32 that helps to remove materials that may contaminate the precursor liquid 2, such as particles from the carbon dioxide source 41. The gas supply 30 may include other components, such as pressure regulators, safety valves, control valves, a compressor or pump (e.g., to increase a pressure of the gas), an accumulator (e.g., to help maintain a relatively constant gas pressure and/or store gas), and so on. In this embodiment, the conduit 31 extends below the surface of the precursor liquid 2 in the reservoir 11 so that the carbon dioxide gas is injected into the liquid 2 for dissolution. The conduit 31 may include a sparging nozzle or other arrangement to aid in dissolution, e.g., by creating relatively small gas bubbles in the liquid 2 to increase the dissolution rate. Alternately, the conduit 31 may deliver the gas to a headspace (if present) in the reservoir 11 rather than below the surface of the liquid 2.

Carbonation of the precursor liquid 2 may occur via one or more mechanisms or processes, and thus is not limited to one particular process. For example, while carbon dioxide gas delivered by the conduit 31 to the reservoir 11 may function to help dissolve carbon dioxide in the liquid 2, other system components may further aid in the carbonation process. In this illustrative embodiment, the precursor supply 10 may assist in carbonating the liquid by circulating the liquid via the pump 13 and the nozzle 14. That is, liquid 2 may be drawn from the reservoir 13 via a dip tube 15 and sprayed by the nozzle 14 into a carbon dioxide-filled headspace in the reservoir 11. As is known in the art, this process can help the liquid 2 to dissolve carbon dioxide gas, e.g., by increasing the surface area of liquid 2 exposed to gas. While in this embodiment the dip tube 15 is separate from the reservoir 11 and extends below the surface of the precursor liquid 2, the dip tube 15 may be arranged in other ways, such as being made integrally with the wall of the reservoir 11. If the dip tube 15 is made integrally with the reservoir 11, connecting the reservoir 11 to the lid 12 may establish a fluid connection between the dip tube 15 and the pump 13. Forming the dip tube 15 integrally with the reservoir 11 may allow the system 1 to accommodate differently sized (and thus different volume) reservoirs 11. In addition, this arrangement may help ensure that only suitably configured reservoirs 11 (e.g., a container arranged to withstand system pressures) is used. Alternately, the dip tube 15 could be made flexible or otherwise accommodate reservoirs 11 having a different height. Whether integral with the reservoir 11 or not, the dip tube 15 may include a filter, strainer or other arrangement to help prevent small particles, such as ice chips, from being drawn into the pump 13. In some embodiments, the reservoirs 11 can function as a drinking glass as well as a reservoir 11 in the system 1. That is, a user may provide a reservoir/drinking glass 11 to the system 1 (e.g., including a desired amount of water, ice and/or beverage medium), and after carbonation is complete, use the reservoir/drinking glass 11 to enjoy the beverage. The reservoir 11 may be insulated, e.g., to help keep a beverage cold, as well as made to withstand suitable pressures experienced in use with the system 1.

The various components of the system 1 may be controlled by a controller 5, which may include a programmed general purpose computer and/or other data processing device along with suitable software or other operating instructions, one or more memories (including non-transient storage media that may store software and/or other operating instructions), a power supply for the controller 5 and/or other system components, temperature and liquid level sensors, pressure sensors, RFID interrogation devices, input/output interfaces (e.g., to display information to a user and/or receive input from a user), communication buses or other links, a display, switches, relays, triacs, motors, mechanical linkages and/or actuators, or other components necessary to perform desired input/output or other functions. In this illustrative embodiment, the controller 5 controls the operation of the valve 21 of the activating fluid supply 20 as well as the pump 13 of the precursor liquid supply 10. Also shown in FIG. 1 is a sensor 51, which may represent one or more sensors used by the controller 5. For example, the sensor 51 may include a temperature sensor that detects the temperature of the precursor liquid in the reservoir 11. This information may be used to control system operation, e.g., warmer precursor liquid temperatures may cause the controller 5 to increase an amount of time allowed for carbon dioxide gas to be dissolved in the precursor liquid 2. In other arrangements, the temperature of the precursor liquid 2 may be used to determine whether the system 1 will be operated to carbonate the liquid 2 or not. For example, in some arrangements, the user may be required to add suitably cold liquid 2 (and/or ice) to the reservoir 11 before the system 1 will operate. (As discussed above, relatively warm precursor liquid 2 temperatures may cause the liquid to be insufficiently carbonated in some conditions.) In another embodiment, the sensor 51 may include a pressure sensor used to detect a pressure in the reservoir 11. This information may be used to determine whether the reservoir 11 is improperly sealed to the lid 12 or another pressure leak is present, and/or to determine whether sufficient carbon dioxide gas is being produced by the cartridge 4. For example, low detected pressure may cause the controller 5 to allow more liquid to be delivered by the activating fluid supply 20 to the cartridge 4, or prompt the user to check that the reservoir 11 is properly engaged with the lid 12. Likewise, high pressures may cause the flow of liquid from the activating fluid supply 20 to be slowed or stopped. Thus, the controller 5 can control the gas pressure in the reservoir 11 and/or other areas of the system 1 by controlling an amount of liquid delivered to the cartridge 4 and/or the cartridge chamber 3. The sensor 51 may alternately, or additionally, detect that the reservoir 11 is in place, and/or whether the reservoir 11 is properly engaged with the lid 12. For example, a switch may be closed when the reservoir 11 is properly seated on a seal of the lid 12, indicating proper engagement. In another arrangement, the reservoir 11 may include an RFID tag or other electronic device that is capable of communicating its identity or other characteristics of the reservoir 11 to the controller 5. This information may be used to confirm whether the reservoir 11 is suitable for use with the system 1, to control certain operating conditions (e.g., an operating pressure may be limited based on the type of reservoir used, the precursor liquid may be carbonated to a level that corresponds to the reservoir 11, and so on), and/or for other uses. The sensor 51 could also detect the presence of a cartridge 4 in the chamber 3, e.g., via RFID tag, optical recognition, physical sensing, etc. If no cartridge 4 is detected, or the controller 5 detects that the cartridge 4 is spent, the controller 5 may prompt the user to insert a new or different cartridge 4. For example, in some embodiments, a single cartridge 4 may be used to carbonate multiple volumes of precursor liquid 2. The controller 5 may keep track of the number of times that the cartridge 4 has been used, and once a limit has been reached (e.g., 10 drinks), prompt the user to replace the cartridge. Other parameters may be detected by the sensor 51, such as a carbonation level of the precursor liquid 2, the presence of a suitable vessel to receive a beverage discharged from the system 1 (e.g., to prevent beverage from being spilled), the presence of water or other precursor liquid 2 in the reservoir 11 or elsewhere in the precursor supply 10, a flow rate of liquid in the pump 13 or associated conduit, the presence of a headspace in the reservoir 11 (e.g., if no headspace is desired, a valve may be activated to discharge the headspace gas, or if only carbon dioxide is desired to be in the headspace, a sniffing valve may be activated to discharge air in the headspace and replace the air with carbon dioxide), and so on.

To cause the beverage making system 1 to create a carbonated beverage, a user may first provide a desired amount of precursor liquid 2 in the reservoir 11, along with optional ice and/or a beverage medium. Alternately, the carbonated liquid may be flavored after carbonation is complete either by automated or manual means. The reservoir 11 is then engaged with the lid 12, such as by engaging a screw thread on the reservoir 11 with the lid 12, activating a clamp mechanism, or other. A cartridge 4 containing a carbon dioxide source 41 (e.g., in solid form, such as a charged zeolite) may be placed in the cartridge chamber 3 and the chamber 3 closed. The cartridge chamber 3 may operate in any suitable way, e.g., like that found in many cartridge-based coffee or other beverage machines. For example, a manual lever may be operated to lift a lid of the chamber 3, exposing a cartridge receiver portion of the chamber 3. With the cartridge 4 in the chamber 3, the lever may be again activated to close the lid, sealing the chamber 3 closed. The controller 5 may then activate the system 1 to deliver liquid to the chamber 3, e.g., to cause carbon dioxide to be generated. The controller 5 may start operation in an automated way, e.g., based on detecting the presence of a cartridge 4 in the chamber 3, liquid 2 in the reservoir 11 and closure of the chamber 3. Alternately, the controller 5 may start system operation in response to a user pressing a start button or otherwise providing input (e.g., by voice activation) to start beverage preparation. The controller 5 may start operation of the pump 13, drawing liquid from the dip tube 15 and discharging the liquid 2 at the nozzle 14. The valve 21 may be opened to deliver a suitable portion of the precursor liquid 2 to the chamber 3, and carbon dioxide gas created may be provided to the reservoir 11 by the gas supply 30. Operation may continue for a preset amount of time, or based on other conditions, such as a detected level of carbonation, a drop in gas production by the cartridge 4, or other parameters. During operation, the amount of liquid provided to the chamber 3 may be controlled to control gas output by the cartridge 4. Control of the liquid provided to the cartridge 4 may be made based on a timing sequence (e.g., the valve 21 may be opened for a period of time, followed by valve closure for a period, and so on), based on detected pressure (e.g., liquid supply may be stopped when the pressure in the chamber 3 and/or reservoir 11 exceeds a threshold, and resume when the pressure falls below the threshold or another value), based on a volume of activating liquid delivered to the chamber 3 (e.g., a specific volume of liquid may be delivered to the cartridge 4), or other arrangements. When complete, the user may remove the beverage and reservoir 11 from the lid 12.

FIG. 1 shows only one illustrative embodiment of a beverage making system 1, but other arrangements are possible, including systems that incorporate other aspects of the invention. For example, in one aspect of the invention, flavoring of a carbonated beverage may be done in an automated way, and may occur in a cartridge. This feature may make the beverage formation process easier and more convenient for a user, as well as help reduce the likelihood of cross contamination between beverages and/or the need to rinse a mixing chamber. That is, by mixing a beverage medium with the precursor liquid in a cartridge (which may be disposable), each beverage made by the system 1 may effectively be made using its own mixing chamber. For example, if a carbonated cherry beverage is made using the system 1, followed by lemon beverage, there may be a possibility that the cherry flavor left behind in a mixing chamber will carry over into the subsequent lemon beverage. Rinsing or other cleaning of a mixing chamber can help eliminate or reduce such flavor cross over, but mixing each beverage in a cartridge may eliminate the need to rinse a mixing chamber or other system components entirely.

In another aspect of the invention, precursor liquid may be carbonated using a contactor (a type of carbonator) that includes a porous membrane (e.g., that is porous at least to gas) having a gas side and a liquid side. Precursor liquid on the liquid side of the carbonator may be exposed to gas on the gas side of the membrane, and since the membrane may be arranged to increase the surface area of the liquid exposed to gas, dissolution of carbon dioxide or other gas into the precursor liquid may be done more rapidly than using other techniques. In one embodiment, the carbonator may include a contactor with a hollow fiber arrangement in which hollow fibers made of a hydrophobic material, such as polypropylene, carry the precursor liquid. The fibers are porous, having holes that, combined with the hydrophobicity of the material, allow for contact of gas on the exterior of the fibers with the liquid while preventing the liquid from exiting the fiber interior. Membrane contactors suitable for such use are made by Membrana of Charlotte, N.C., USA.

In yet another aspect of the invention, a cartridge chamber of a beverage making system may be arranged to hold first and second cartridge portions where the first cartridge portion contains a carbon dioxide source arranged to emit carbon dioxide gas for use in carbonating the precursor liquid, and the second cartridge portion contains a beverage medium arranged to be mixed with a liquid precursor to form a beverage. The cartridge chamber may have a single cartridge receiving portion for receiving both cartridge portions, or may include a plurality of cartridge receiving portions that are separate from each other, e.g., for receiving two or more cartridges that are each associated with a first or second cartridge portion. Such an arrangement may help simplify use of the system, particularly where the cartridge portions are arranged for only a single use, e.g., formation of a single volume of beverage and discarded thereafter. For example, a user may be enabled to place one or two cartridges that include the first and second cartridge portions in receiving portions of the cartridge chamber without the need for establishing pressure-tight, leak-proof or other connections needed for the system to operate properly. Instead, the cartridge portions may be simply placed in a receiver, and the cartridge chamber closed, making the system ready for beverage production.

Figure 2:
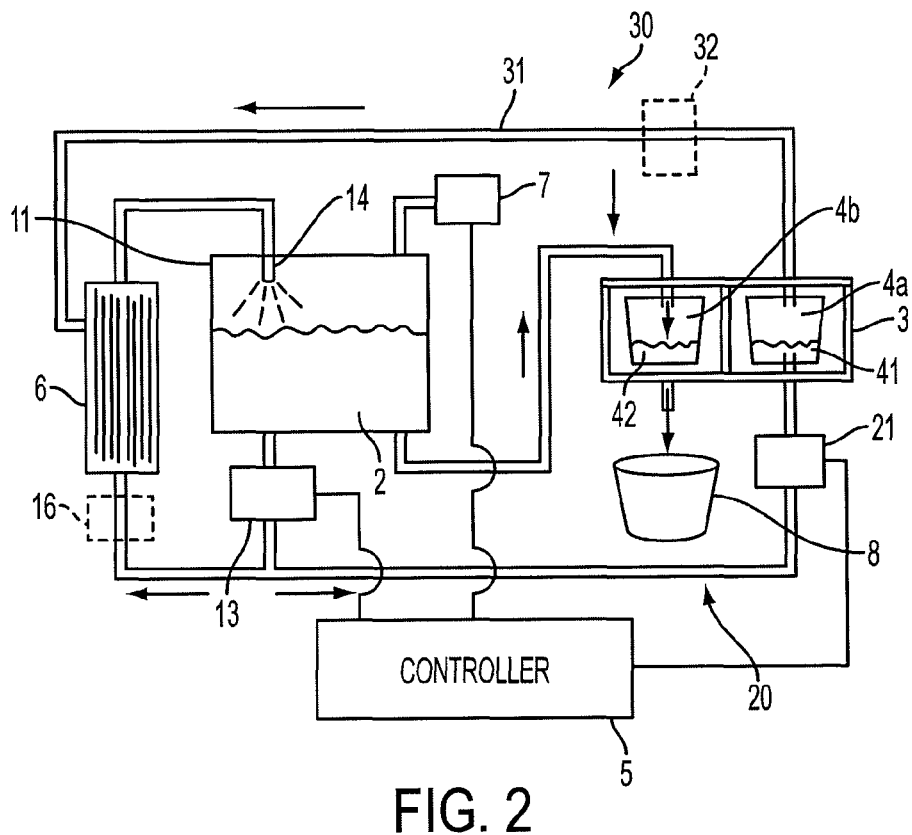
FIG. 2 shows a illustrative embodiment of a beverage making system having a contactor arranged to circulate precursor liquid.

FIG. 2 shows another illustrative embodiment that incorporates the aspects of using a membrane contactor to carbonate the precursor liquid with a cartridge-provided gas, mixing a beverage medium with liquid in a cartridge, and the use of a cartridge chamber that receives first and second cartridge portions that respectively contain a gas source and beverage medium. This embodiment is similar to that in FIG. 1 in many ways, and may be modified to have one or more components like that in FIG. 1. However, certain alternate arrangements are shown in FIG. 2 to illustrate another few ways in which a beverage making system 1 may be modified in accordance with aspects of the invention. In this embodiment, the reservoir 11 is a closed tank having no removable lid. The reservoir 11 may have any suitable volume, and is fluidly coupled to a pump 13 that can circulate the precursor liquid 2 through a contactor 6 and back to the reservoir 11 via a nozzle 14. As discussed above, the precursor liquid 2 may pass through hollow fibers in the contactor 6 to pick up carbon dioxide or other gas around the fibers, but this arrangement could be reversed, with gas flowing in the fibers and the precursor liquid 2 located on the exterior of the fibers. A filter 16 may be provided to remove materials in the precursor liquid 2 that might clog the fibers, pores in the fibers or otherwise interfere with the operation of the contactor 6. Alternately, or in addition, the filter 16 may condition the liquid 2, e.g., by softening, removing alkaline or other elements that tend to raise the pH of the liquid 2, by removing elements that may prevent the formation of a good tasting beverage, and so on. For example, the filter 16 may include an activated charcoal and/or other components found in commonly used water filters. The contactor 6 may be arranged to have a plurality of hollow fibers extending within a closed tube or other chamber so that the inner passages of the fibers fluidly connects a fluid inlet of the contactor 6 to a fluid outlet. The gas space around the fibers may communicate with the carbon dioxide supply 30 via one or more ports on the gas side of the contactor 6. It should be understood, however, that the contactor 6 may be arranged in other ways, such as having one or more membranes in the form of a flat sheet or other forms other than tubular to define a liquid side and a gas side of the contactor 6.

The activating fluid supply 20 is arranged similarly to that in FIG. 1, with a controllable valve 21 fluidly coupled to an output of the pump 13. However, in this embodiment, the activating fluid supply 20 introduces liquid near a bottom of the cartridge chamber 3 and the cartridge 4. This arrangement may help the activating fluid supply 20 to better control gas release from the carbon dioxide source 41. For example, dropping water onto the carbon dioxide source 41 from the top may allow the water to spread over a wide area, allowing charged zeolites or other source materials spread over a wide area to release gas. By providing liquid from below, the activating fluid supply 20 may flood the cartridge 4 and/or chamber 3, thereby allowing water to contact source materials 41 starting from the bottom up. This may allow for closer control of the volume of source materials 41 that are activated to release gas. In the case that the carbon dioxide source 41 can wick or otherwise move water upwardly (such as by capillary action), portions of the source 41 may be separated from each other by non-wicking agents. For example, the source 41 may include a set of stacked discs of zeolite material that are separated by a non-wicking material, such as metal or solid plastic separators. This may allow the fluid supply 20 to stepwise increase the fluid level in the cartridge 4 over a period of time to sequentially activate individual discs.

Gas produced by the cartridge 4 is routed by the gas supply 30 (via an optional filter 32 and conduit 31) to the gas side of the contactor 6. The conduit 31 may include a water-buoyant check valve or other arrangement that allows gas to pass to the contactor 6, but prevents liquid from exiting the cartridge chamber 3. For example, a floating ball in the cartridge chamber 3 may normally leave an opening of the conduit 31 free for gas flow, but may raise upwardly on the surface of liquid in the cartridge 4 to close the opening, e.g., in case that the activating fluid supply 20 provides an excess of activating liquid. The controller 5 may monitor the gas pressure in the chamber 3, in the conduit 31 and/or in the gas side of the contactor 6 to control the activating fluid supply 20 and gas production. In one embodiment, the activating fluid supply 20 may be controlled to provide approximately 35-45 psi gas pressure at the gas side of the contactor 6. This pressure has been found to work at least adequately in carbonating about 400-500 ml of water at a temperature of about 0 degrees C. in about 30-60 seconds using a hollow fiber contactor, as described in more detail below in the Examples. As carbon dioxide in the contactor is dissolved into the precursor liquid 2, the pressure on the gas side will drop, prompting the controller 5 to supply additional liquid 2 to the cartridge 4a to cause additional gas to be created. Similar to the system in FIG. 1, this process may be performed based on any criteria, such as the passage of a specific amount of time, the detection of a specified level of carbonation of the liquid 2, exhaustion of the carbon dioxide source 41, a volume of liquid delivered to the cartridge 4a, etc., so that a pressure of the carbon dioxide gas can be maintained within a desired range above ambient pressure.

Once carbonation of the precursor liquid 2 is complete, the controller 5 may direct the liquid 2 to a beverage medium cartridge 4b in the cartridge chamber 3. While the precursor liquid 2 may be caused to flow from the reservoir 11 in any suitable way (such as by gravity, a pump, etc.), in this embodiment, the controller 5 activates an air pump 7 which pressurizes the reservoir 11 such that the precursor liquid 2 is forced to flow via a conduit to the cartridge chamber 3 and the beverage medium cartridge 4b. In other embodiments, gas pressure created by the carbon dioxide source 41 may be used to pressurize the reservoir 11 and drive the flow of the precursor liquid to the beverage medium cartridge 4b. For example, when carbonation is complete, gas from the cartridge 4a may be routed directly into the reservoir 11 instead of to the contactor 6 so as to pressurize the reservoir 11. Although no valve is shown in the conduit that fluidly couples the reservoir 11 and the cartridge 4b, a controllable valve, pump or other suitable component may be added to control flow as desired. The use of air or other gas to move liquid 2 through the cartridge 4b (or to expel beverage medium from the cartridge 4b) may allow the system 1 to "blow down" the cartridge 4b at or near the end of the beverage process, e.g., to remove any remaining material from the cartridge 4b. This may be useful in making the cartridge 4b less messy to handle (e.g., by reducing the likelihood that the cartridge 4b will drip when removed from the chamber 3. A similar process may be used to blow down the cartridge 4a, e.g., using an air pump or gas produced by the source 41.

Flow of the precursor liquid 2 through the beverage medium cartridge 4b may cause the liquid 2 to mix with the beverage medium 42 before being discharged, e.g., to a waiting cup 8 or other container. The beverage medium cartridge 4b may include any suitable beverage making materials (beverage medium), such as concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutriceuticals, etc.), powdered or liquid milk or other creamers, sweeteners, thickeners, and so on. (As used herein, "mixing" of a liquid with a beverage medium includes a variety of mechanisms, such as the dissolving of substances in the beverage medium in the liquid, the extraction of substances from the beverage medium, and/or the liquid otherwise receiving some material from the beverage medium.) The liquid 2 may be introduced into the cartridge 4b in any suitable way, and/or the cartridge 4b may be arranged in any suitable way to aid in mixing of the liquid 2 with the beverage medium 42. For example, the precursor liquid 2 may be introduced into the cartridge 4b so as to cause a spiral or other flow pattern, the cartridge 4b may include a labyrinth or other tortuous flow path to cause turbulence in the flow to aid in mixing, and so on. One potential advantage of mixing the precursor liquid 2 in a beverage medium cartridge 4b is that cross contamination of beverage medium that may occur with the use of a mixing chamber that is used to mix beverage medium and liquid 2 for every beverage made by the system 1 may be avoided. However, the system 1 could be modified to employ a reused mixing chamber, e.g., a space where beverage medium 42 that is provided from a cartridge 4b and precursor liquid 2 are mixed together in much the same way that fountain drinks are formed by commercial drink machines. For example, the beverage medium 42 could be driven from the cartridge 4b (e.g., by air pressure, carbon dioxide gas pressure created by the cartridge 4a, by gravity, by suction created by an adductor pump, venturi or other arrangement, etc.) into a mixing chamber where the precursor liquid 2 is also introduced. Rinsing of the mixing chamber may or may not be necessary, e.g., to help prevent cross contamination between beverages. In some arrangements, the entire volume of beverage medium 42 may be discharged into the mixing chamber, causing initial amounts of flavored precursor liquid 2 exiting the mixing chamber to have a high beverage medium concentration. However, as the beverage medium 42 is swept from the mixing chamber by the precursor liquid 2, the precursor liquid itself may effectively rinse the mixing chamber.

Figure 3:
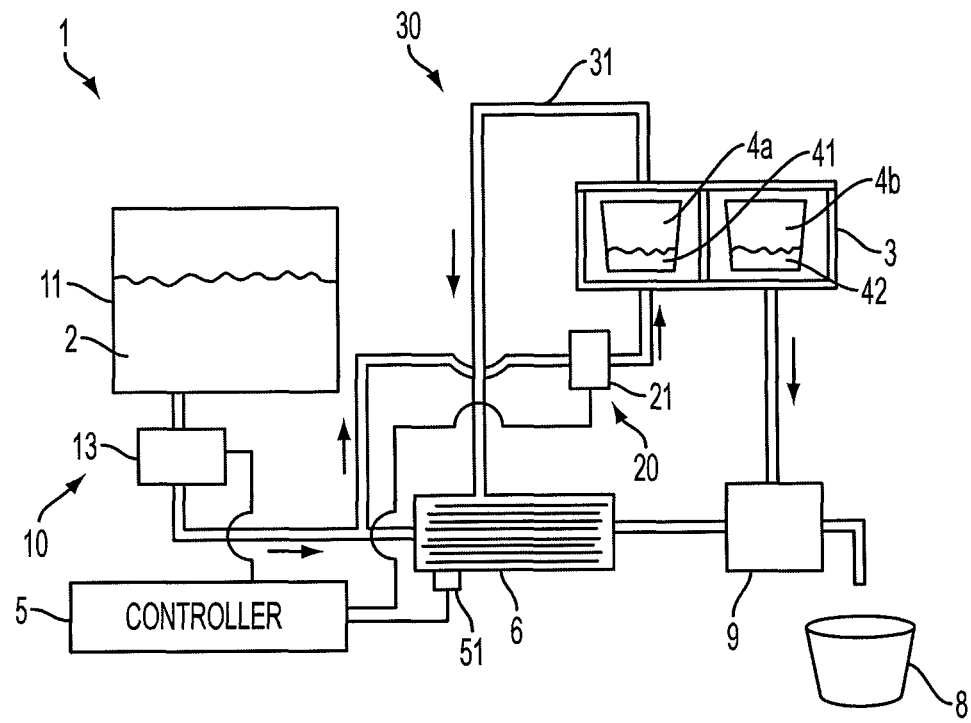
FIG. 3 shows a illustrative embodiment of a beverage making system in which liquid is carbonated in a single pass through a carbonator.

The embodiment of FIG. 2 could be modified so that flow of precursor liquid 2 exiting the contactor 6 is routed directly to the beverage medium cartridge 4b or to another mixing chamber where beverage medium 42 is mixed with the carbonated precursor liquid 2, e.g., like that shown in FIG. 3. That is, in this illustrative embodiment, carbonated precursor liquid 2 does not circulate from the reservoir 11, through the contactor 6 and back to the reservoir 11, but instead precursor liquid 2 makes a single pass through the contactor 6 and then proceeds to mixing with the beverage medium 42 in a mixing chamber 9 and discharge to a cup 8. The mixing chamber 9 may take any suitable form, e.g., may cause the precursor liquid 2 and beverage medium 42 to move in a spiral, swirl or other fashion to enhance mixing, may have one or more motor driven blades, impellers or other elements to mix contents in the chamber 9, and so on. The mixing chamber 9 may be cooled as well, e.g., by a refrigeration system, to help cool the beverage provided to the cup 8. Alternately, the precursor liquid 2 may be cooled in the reservoir 11 and/or any other locations in the system 1. In the case where the carbonated liquid 2 is not flavored or where the liquid 2 is mixed with the beverage medium 42 before passing through the carbonator 6, the mixing chamber 9 may be eliminated or arranged to mix the precursor liquid 2 and beverage medium 42 upstream of the contactor 6. Alternately, the precursor liquid supply 10 may be arranged to mix the precursor liquid 2 with the beverage medium 42 in the cartridge 4b prior to routing the liquid 2 to the contactor 6. The controller 5 may detect the gas pressure on the gas side of the contactor 6, and control fluid supply to the cartridge 4a accordingly, e.g., to maintain a suitable gas pressure in the contactor 6. The reservoir 11 may be a water storage tank that is not pressurized in this embodiment, and may be removable from the system 1, e.g., to make filling by a user easier. The user may add ice and/or beverage medium to the precursor liquid 2 in the reservoir 11, if desired. Alternately, the reservoir 11 and pump 13 may be replaced by a plumbed connection to a pressurized water supply and an optional control valve and/or pressure reducer. Of course, as with other embodiments, the system 1 may be suitably enclosed in a housing having a visible display, user input buttons, knobs, or touch screen, user-operated devices for opening/closing a cartridge chamber, and other features found in beverage making machines.

Figure 4:
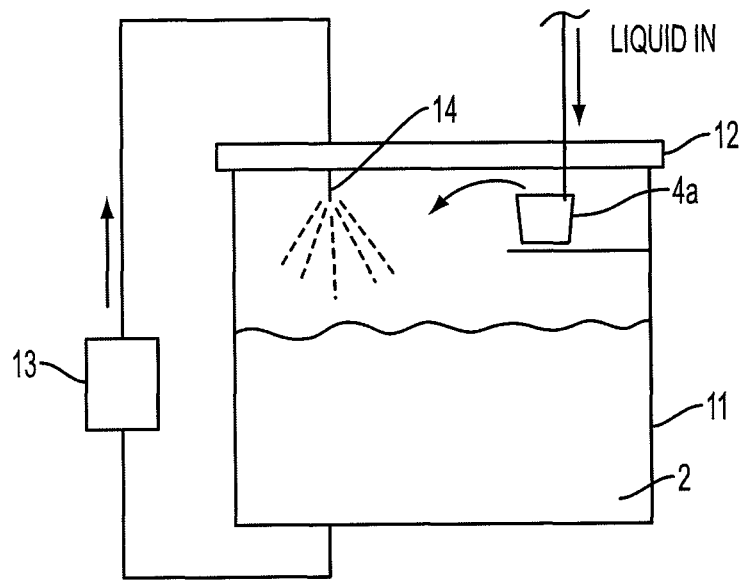
FIG. 4 shows an illustrative embodiment of a beverage making system in which a gas cartridge is located in a carbonation reservoir.

Other arrangements for a beverage forming system 1 are possible, such as that shown in FIG. 4. In this illustrative embodiment, the cartridge chamber 3 is combined with the reservoir 11 such that the cartridge 4a having a carbon dioxide source 41 is located in the reservoir 11. The cartridge 4a may be placed in the reservoir 11/cartridge chamber 3 by removing the lid 12 from the reservoir 11. Liquid may be provided to the cartridge 4a by any suitable activating fluid supply 20, such as an arrangement like that in FIG. 1, a syringe or piston pump that delivers a metered amount of liquid to the cartridge 4a, and others. In this embodiment, the carbon dioxide supply 30 is combined with the reservoir 11 such that a portion of the reservoir functions to deliver carbon dioxide gas to the precursor liquid 2. The pump 13 may aid the carbonation process by circulating the liquid 2 and spraying the liquid 2 into a carbon dioxide-filled headspace in the reservoir 11. In another embodiment, a contactor 6 may be provided in the reservoir 11 (e.g., at the location of the nozzle 14) so that the liquid 2 flows through hollow fibers extending downwardly from the lid 12 while carbon dioxide in the headspace is absorbed by the liquid while passing through the fibers. In yet another arrangement, the membrane portion of a contactor 6 may be at least partially submerged in the precursor liquid 2, and gas from the source 41 may be passed through hollow fibers of the contactor 6. As a result, the liquid 2 on the outside of the fibers may pick up carbon dioxide from the gas passing through the fibers.

Figure 5:
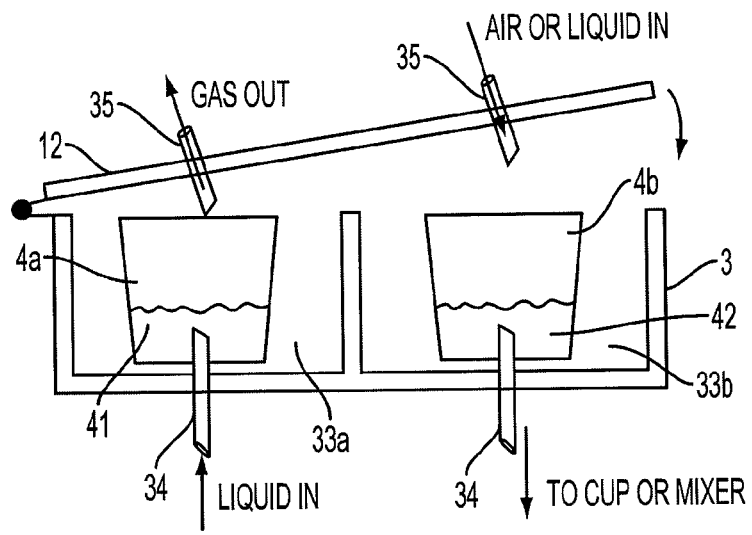
FIG. 5 shows an illustrative embodiment of a cartridge chamber.

While the cartridge chamber 3 may be arranged in any suitable way, FIG. 5 shows one illustrative arrangement in which both a carbon dioxide source cartridge 4a and a beverage medium cartridge 4b can be received by the same cartridge chamber 3. In this embodiment, the cartridges 4a, 4b (which respectively have a portion that contains a gas source 41 and beverage medium 42) are received in separate cartridge receivers 33, and each cartridge receiver 33 may include a piercing element 34 at a bottom of the cartridge receiver 33. The piercing element 34, which may include a hollow needle, spike, blade, knife or other arrangement, may form an opening in the respective cartridge 4. Alternately, the cartridges 4 may have defined openings, e.g., one or more ports, that include a septum or other valve-type element that permits flow into and/or out of the cartridge 4. Similarly, the lid 12 may include piercing element 35 that form an opening in the top of the respective cartridge 4, e.g., when the lid 12 is closed. When closed, the lid 12 may form a sealed chamber in which the cartridges 4a, 4b are located and isolated from each other. The openings formed in the cartridges 4a, 4b may allow for communication with the interior space of the cartridges 4a, 4b as outlined in FIG. 5. For example, an opening at the top of the cartridge 4a may allow carbon dioxide or other gas to exit the cartridge chamber 3, while the opening at the bottom of the cartridge 4a may allow for water or other activating fluid to enter the cartridge 4a. Of course, the openings may be formed in other locations, such as an opening for allowing fluid input to occur at the top or side of the cartridge. Likewise, gas may exit the cartridge through a bottom, side or otherwise located opening. As mentioned above, gas may be permitted to leak from the cartridge 4a into the space in the cartridge chamber 3 around the cartridge 4a, e.g., through the opening in the cartridge 4a, through a hole or other opening in the piercing element 35, etc. This may allow the pressure around the cartridge to equalize with the pressure inside the cartridge during gas production, helping to prevent bursting of the cartridge 4a. Alternately, the cartridge 4a may fit closely into the cartridge receiver 33 so that the cartridge chamber 3 can support the cartridge 4a (if necessary). The opening in the top of the beverage medium cartridge 4b may allow for precursor liquid 2 to be introduced into the cartridge 4b (e.g., for mixing with the beverage medium), or for pressurized air or other gas to enter the cartridge (e.g., for forcing the beverage medium 42 from the cartridge 4b and into a mixing chamber). The opening at the bottom of the cartridge 4b may allow for beverage to exit to a waiting cup or other container, or for the beverage medium to travel to a mixing chamber. As with the cartridge 4a, opening in the beverage medium cartridge 42 may be arranged in any suitable location or locations.

The cartridge chamber 3 may open and close in any suitable way to allow cartridges 4 to be placed in and/or removed from the chamber 3. In the FIG. 5 embodiment, the lid 12 is pivotally mounted to the receiver portion of the chamber 3, and may be opened and closed manually, such as by a handle and linkage arrangement, or automatically, such as by a motor drive, to close the cartridge receivers 33. In other embodiments, the lid 12 may have two or more sections that are each associated with a respective cartridge receiver 33. Thus, the lid sections can be moved independently of each other to open/close the cartridge receivers 33. Of course, the lid 12 may be arranged in other ways, such as being engaged with the receivers 33 by a threaded connection (like a screw cap), by the receivers 33 moving away and toward the lid 12 while the lid 12 remains stationary, by both the lid and receiver portion moving, and so on. In addition, a cartridge chamber 3 need not necessarily have a lid and receiver arrangement like that shown in FIG. 5, but instead may have any suitable member or members that cooperate to open/close and support a cartridge. For example, a pair of clamshell members may be movable relative to each other to allow receipt of a cartridge and physical support of the cartridge. Some other illustrative cartridge chamber arrangements are shown, for example, in U.S. Pat. Nos. 6,142,063; 6,606,938; 6,644,173; and 7,165,488. As mentioned above, the cartridge chamber 3 may allow a user to place one or more cartridges in the chamber 3 without the need for the user to take special steps to establish a pressure-tight, leak-proof or other specialized connection between the cartridge and other portions of the system 1. Instead, in some embodiments, the user may be able to simply place the cartridge in a receiving space, and close the cartridge chamber.

The cartridges 4 used in various embodiments may be arranged in any suitable way, such as a relatively simple frustoconical cup-shaped container having a lid attached to the top of the container, e.g., like that in some beverage cartridges sold by Keurig, Incorporated of Reading, Mass. and shown in U.S. Pat. No. 5,840,189, for example. In one embodiment, a cartridge having a frustoconical cup-shaped container and lid may have an approximate diameter of about 30-50 mm, a height of about 30-50 mm, an internal volume of about 30-60 ml, and a burst resistance of about 80 psi (i.e., a resistance to cartridge bursting in the presence of a pressure gradient of about 80 psi from the inside to outside of the cartridge in the absence of any physical support for the cartridge). However, as used herein, a "cartridge" may take any suitable form, such as a pod (e.g., opposed layers of filter paper encapsulating a material), capsule, sachet, package, or any other arrangement. The cartridge may have a defined shape, or may have no defined shape (as is the case with some sachets or other packages made entirely of flexible material. The cartridge may be impervious to air and/or liquid, or may allow water and/or air to pass into the cartridge. The cartridge may include a filter or other arrangement, e.g., in the beverage medium cartridge 4b to help prevent some portions of the beverage medium from being provided with the formed beverage, and/or in the gas cartridge 4a to help prevent carbon dioxide source material from being introduced into the beverage or other system components.

In one aspect of the invention, the cartridge or cartridges used to form a beverage using the beverage making system may have a volume that is less, and in some cases substantially less, than a beverage to be made using the cartridge(s). For example, if carbon dioxide and beverage medium cartridges 4 are used, the cartridges may each have a volume that is about 50 ml or less, and be used to form a beverage having a volume of about 200-500 ml or more. The inventors have found (as shown in some of the Examples below) that an amount of charged carbon dioxide adsorbent (e.g., a charged zeolite) of about 30 grams (which has a volume of less than 30 ml) can be used to produce about 400-500 ml of carbonated water having a carbonation level of up to about 3.5 volumes. Moreover, it is well known that beverage-making syrups having a volume of less than 50 ml can be used to make a suitably flavored beverage having a volume of about 400-500 ml. Thus, relatively small volume cartridges (or a single cartridge in some arrangements) having a volume of about 100 ml or less may be used to form a carbonated beverage having a volume of about 100 to 1000 ml, and a carbonation level of about 1.5 to 4 volumes in less than 120 seconds, e.g., about 60 seconds, and using pressures under 50 psi.

Figure 6:
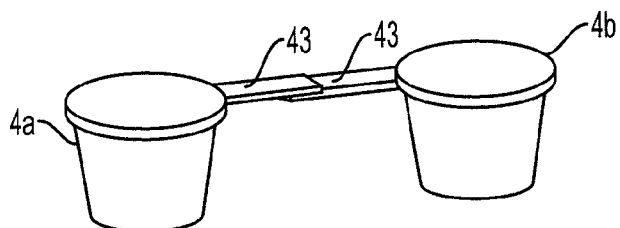
FIG. 6 shows an illustrative embodiment of gas and beverage medium cartridges joined together.

While the carbon dioxide and beverage medium cartridges 4 can be provided separately, in one embodiment, the cartridges 4 may be joined together, like that shown in FIG. 6.

The cartridges 4a, 4b may be connected together by any suitable arrangement, such as tabs 43 that extend from respective cartridges 4a, 4b and are attached together, e.g., by thermal welding, adhesive, interlocking mechanical fasteners such as snaps or clips, etc. This arrangement may allow the cartridges 4a, 4b to be made separately in the manufacturing setting, e.g., because the cartridges require very different processes for manufacturing. For example, the beverage medium cartridge 4b may require a highly sterile environment, whereas the gas cartridges 4a need not be made in such an environment. In contrast, the gas cartridges 4a may need to be manufactured in a water vapor-free environment, whereas the beverage medium cartridge 4b may not be subject to such requirements. After manufacture of the cartridges 4a, 4b, the cartridges may be attached together in a way that prevents their separation without the use of tools (such as a scissor) and/or damage to one or both of the cartridges. The cartridge chamber 3 may be arranged to accommodate the attached cartridges, allowing a user to place a single item in the chamber 3 to form a beverage. In addition, the cartridges 4 and/or the way in which the cartridges are attached, together with the arrangement of the cartridge chamber 3 may help ensure that the gas cartridge 4a and beverage medium cartridge 4b are placed in the proper cartridge receiver 33. For example, the cartridges 4 may have different sizes, shapes or other configurations so that the combined cartridges 4 cannot be placed into the chamber 3 in the wrong orientation. Alternately, the controller 5 may detect that the cartridges have been improperly placed (e.g., by communicating with an RFID tag on one or both of the cartridges, by optically or otherwise identifying the cartridges, etc.), and prompt the user to make a change as necessary.

Figure 7:
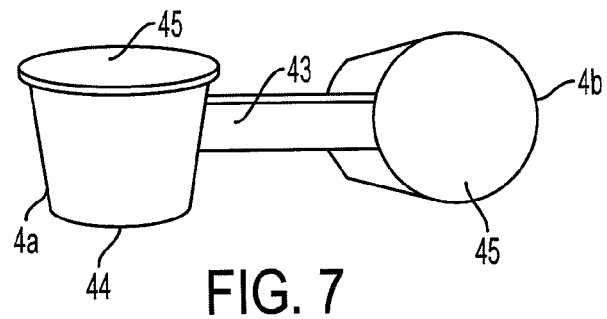
FIGS. 7 and 8 shown perspective and top views, respectively, of gas and beverage medium cartridges.
Figure 8:
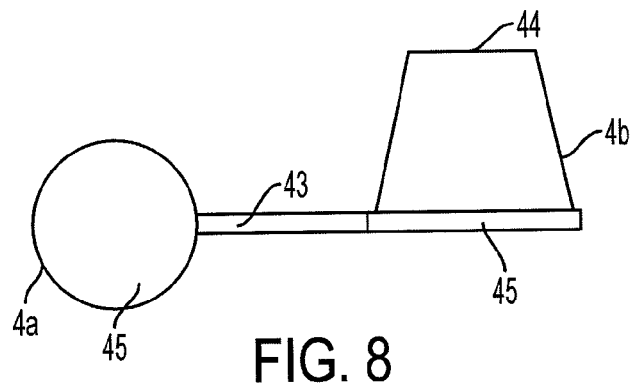

FIGS. 7 and 8 show another embodiment in which a pair of cartridges are joined together in a way that helps prevent improper placement of the cartridges in a chamber and/or enables the cartridges to operate in other orientations. As shown in FIG. 7, the cartridges 4a and 4b are attached by a connection 43 such that with the cartridge 4a arranged in an upright orientation with the container bottom 44 facing downward and the lid 45 covering the top of the container facing upward, the cartridge 4b is on its side with the lid 45 facing to the side. FIG. 8 shows a top view of the embodiment, with the lid 45 of the cartridge 4a facing the viewer and the lid 45 of the cartridge 4b facing downwardly. This arrangement may be useful in embodiments where the cartridges 4 are pierced only at the lid area, e.g., are not pierced in the bottom 44 or other portions of the container. That is, the gas cartridge 4a may be pierced at the lid 45 to allow liquid to be introduced into the cartridge 4a, and to allow gas to exit. Similarly, the lid 45 of the cartridge 4b may be pierced to allow liquid to be introduced into the cartridge 4b for mixing with the beverage medium 42 and to allow a flavored beverage to exit the cartridge 4b. Avoiding piercing of the container may be useful in arrangements where the container is made of a relatively thick and/or rigid material (e.g., to withstand operating pressures for the cartridge 4).

Figure 9:
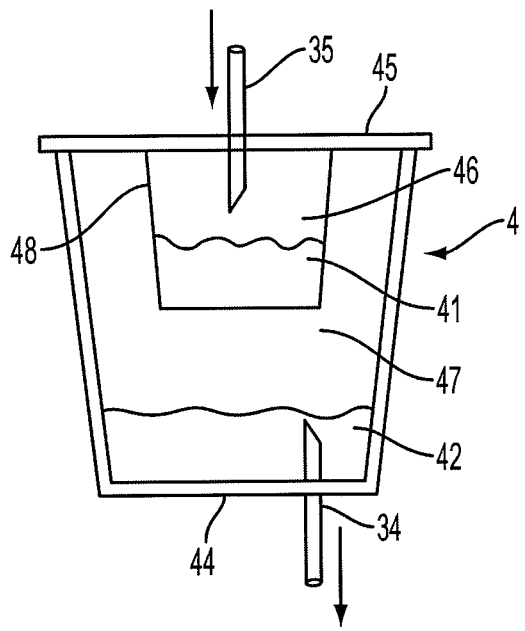
FIG. 9 shows an illustrative embodiment of a cartridge arranged to carbonate a liquid in the cartridge.

In another aspect of the invention, a single cartridge may be used to provide a carbonating gas as well as a beverage medium. In fact, in some embodiments, the precursor liquid can be both carbonated and flavored in the same cartridge. For example, FIG. 9 shows a cross sectional view of a cartridge 4 that includes both a gas source 41 (e.g., a zeolite carbon dioxide source) and a beverage medium 42. In this embodiment, the cartridge 4 includes first and second chambers (or portions) 46, 47 that respectively contain the gas source 41 and the beverage medium 42. The first and second chambers (or portions) 46, 47 may be separated from each other by a permeable element, such as a filter, or an impermeable element, such as a wall molded with the cartridge container. In this embodiment, the first and second chambers (or portions) 46, 47 are separated by a filter 48 that is attached to the lid 45, but could be arranged in other ways. Precursor liquid and/or an activating liquid may be introduced into the first chamber 46 by a piercing element 35 or other arrangement, such as a port formed as part of the cartridge 4. The interior space of the cartridge 4 may be maintained under pressure, e.g., 30-150 psi above ambient or greater, so that dissolution of carbon dioxide gas released by the source 41 occurs more rapidly than would occur at lower pressures. In addition, the system 1 arranged to use such cartridges may include a backpressure valve or other arrangement that helps to maintain a suitable pressure in the cartridge 4, e.g., as an aid to carbonation. As mentioned above, a cartridge chamber 3 that holds the cartridge 4 may be arranged to closely fit the cartridge 4 as needed to support the cartridge and prevent the cartridge from bursting. Alternately, pressure in the cartridge 4 may be allowed to leak into a space around the cartridge 4 to equalize the pressures inside and outside of the cartridge. Carbonated precursor liquid 2 and/or a liquid/gas bubble mixture may pass through the filter 48 into the second chamber 47 for mixing with the beverage medium 42. Thereafter, the precursor liquid 2 and beverage medium 42 mixture may exit the cartridge 4, e.g., through a piercing element 34 at the container bottom 44. Dissolution of carbon dioxide into the precursor liquid 2, as well as mixing of the beverage medium 42 with the liquid 2, may continue after the materials exit the cartridge 4. For example, a mixing chamber may be located downstream of the cartridge 4 to help more thoroughly mix the beverage medium and liquid if needed. Also, a conduit downstream of the cartridge may help continue dissolution of gas, e.g., by maintaining pressure in the liquid.

Figure 10:
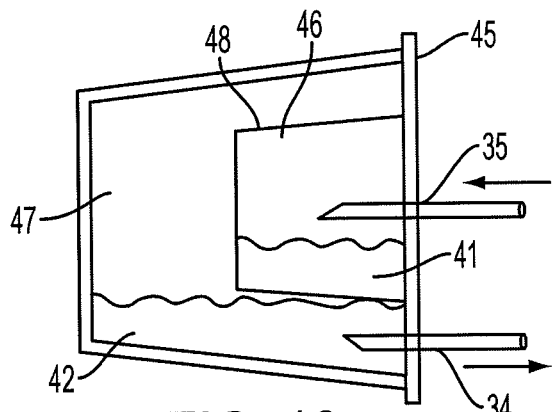
FIG. 10 shows an illustrative embodiment of a cartridge arranged to carbonate a liquid in the cartridge in an alternative orientation.

In the embodiments above, the cartridge 4 has been described to have a defined bottom and top with the cartridge operating in an upright configuration. However, as suggested in connection with FIGS. 7 and 8, a cartridge may be operated in any suitable orientation. For example, FIG. 10 shows an embodiment in which a cartridge configured like that in FIG. 9 is used while the cartridge 4 is on its side. (Note that the cartridge 4b in FIGS. 7 and 8 may be used in a similar way to that shown in FIG. 10.) Precursor liquid may be introduced into the first chamber (or portion) 46 (e.g., via the piercing element 35), causing the gas source 41 to emit gas and at least partially flooding the cartridge 4 interior space. As with the FIG. 9 embodiment, the liquid may be carbonated and mix with the beverage medium 42 before exiting the cartridge, e.g., via the piercing element 34.

Figure 11:
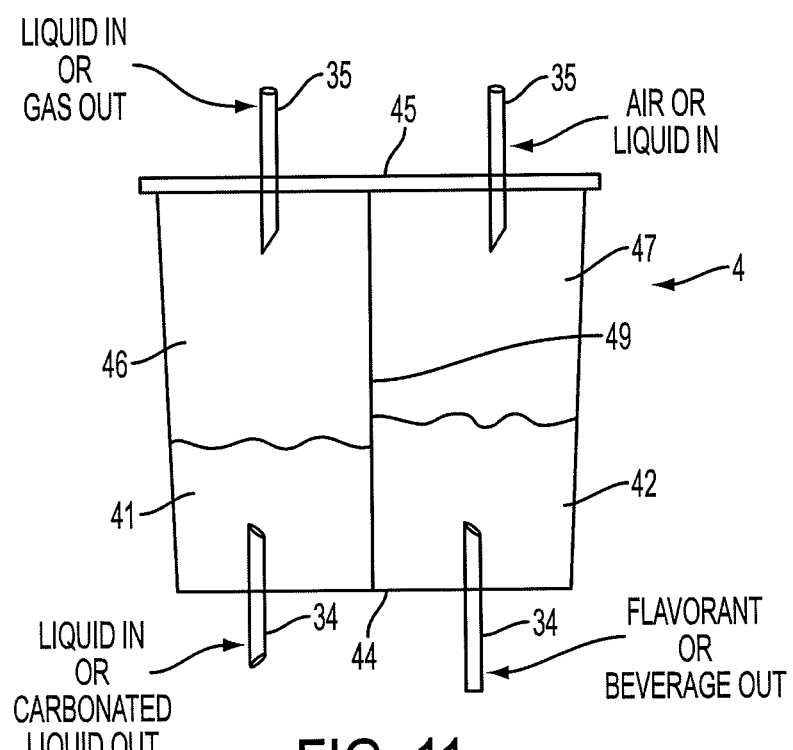
FIG. 11 shows an illustrative embodiment of a cartridge having isolated chambers containing a gas source and a beverage medium.

As also mentioned above, a single cartridge 4 may be arranged to have first and second chambers 46, 47 that are isolated from each other. FIG. 11 shows one such embodiment in which first and second chambers (or portions) 46, 47 are separated by a wall 49. A cartridge like that shown in FIG. 11 may be used, for example, in a system 1 like that shown in FIG. 2, although the cartridge chamber 3 may need to be modified to accommodate the single cartridge 4. As shown in FIG. 11, in one embodiment, activating liquid may be provided via a piercing element 35 at a top of the first chamber (or portion) 46, and gas may exit via the same or a different opening. Alternately, activating liquid may be introduced via the piercing element 34 at the bottom of the first chamber (or portion) 46, and gas may exit via the piercing element 35 at the top. In yet another embodiment, precursor liquid may be introduced at the top piercing element 35 and carbonated liquid may exit via the bottom piercing element 34. The first chamber (or portion) 46 may include a filter or other suitable components, e.g., to help prevent the gas source 41 from exiting the chamber (or portion) 46. Regarding the second chamber (or portion) 47, air or other gas may be introduced via the piercing element 35 at a top of the second chamber (or portion) 47, causing beverage medium 42 to be moved out of the piercing element 34 at the bottom of the second chamber (or portion) 47. Alternately, precursor liquid may be introduced via the piercing element 35 at a top of the second chamber 47, may mix with the beverage medium 42 and exit the cartridge 4 out of the piercing element 34. As discussed above, the piercing element 34, 35 arrangement in this illustrative embodiment should not be interpreted as limiting aspects of the invention in any way. That is, piercing elements need not be used, but instead flow into/out of the cartridge 4 may occur through defined ports or other openings in the cartridge 4. Also, flow ports or other openings in the cartridge need not necessarily be located at the top, bottom or other specific location.

The cartridge(s) may be made of any suitable materials, and are not limited to the container and lid constructions shown herein. For example, the cartridge(s) may be made of, or otherwise include, materials that provide a barrier to moisture and/or gases, such as oxygen, water vapor, etc. In one embodiment, the cartridge(s) may be made of a polymer laminate, e.g., formed from a sheet including a layer of polystyrene or polypropylene and a layer of EVOH and/or other barrier material, such as a metallic foil. Moreover, the cartridge(s) materials and/or construction may vary according to the materials contained in the cartridge. For example, a gas cartridge 4a may require a robust moisture barrier, whereas a beverage medium cartridge 4b may not require such a high moisture resistance. Thus, the cartridges may be made of different materials and/or in different ways. In addition, the cartridge interior may be differently constructed according to a desired function. For example, a beverage medium cartridge 4b may include baffles or other structures that cause the liquid/beverage medium to follow a tortuous path so as to encourage mixing. The gas cartridge 4a may be arranged to hold the gas source 41 in a particular location or other arrangement in the interior space, e.g., to help control wetting of the source 41 with activating liquid.

EXAMPLE 1

The release properties of a carbon dioxide adsorbent were measured in the following way: 8×12 beads of sodium zeolite 13X (such as are commercially available from UOP MOLSIV Adsorbents) were obtained. The beads were placed in a ceramic dish and fired in a Vulcan D550 furnace manufactured by Ceramco. The temperature in the furnace containing the beads was raised to 550° C. at a rate of 3° C./min and was held at 550° C. for 5 hours for firing and preparation of the beads for charging with carbon dioxide.

The beads were removed from the furnace and immediately transferred to a metal container equipped with a tightly fitted lid and entrance and exit ports permitting circulation of gas. With the beads sealed in the container, the container was flooded with carbon dioxide gas and pressurized to 15 psig. (Note, however, that experiments have been performed between 5-32 psig.) The chamber was held at the set pressure for 1 hour. During this hold period the chamber was bled every 15 min. At the end of this period a quantity of gas had adsorbed to the beads.

A 30 g sample of charged 13X zeolite was measured, and a beaker filled with 250 ml of water at room temperature of 22° C. The beaker and water was placed on a balance and the balance zeroed. The 30 g of charged zeolite was then added to the beaker and the change in weight versus time was measured. It was shown that the change in weight became approximately steady after a period of 50 seconds, and that the beads lost about 4.2 g (14 wt %) of weight attributed to the release of carbon dioxide. Of course, some carbon dioxide may have been dissolved into the water.

| Time (sec) | Weight (grams) |
|---|---|
| 0 | 30 |
| 25 | 26.7 |
| 50 | 25.8 |
| 75 | 25.6 |
| 100 | 25.5 |

EXAMPLE 2

Charged zeolite 13X was prepared as in Example 1. A 30 g sample of the charged zeolites was then placed in metal chamber with a water inlet port at the bottom and a gas outlet port at the top. The chamber that held the zeolites was 34×34 mm in cross section and had 2 metal filter discs with 64$\frac{1}{16}$" diameter holes to retain the zeolite material. Tap water was then flooded into the bottom of the chamber perpendicular to the cross-section at an average flow rate of 60 ml/min. Gas evolved through the top outlet port.

The pressure of the gas in the chamber was measured with a pressure gauge and controlled using a needle valve attached to the exit port of the gas chamber. The needle valve was set to maintain the chamber at a pressure of 35 psig by manually adjusting the valve over the course of exposing charged zeolites in the chamber to water. Once the valve was set to an operating pressure, the system would perform repeatably with zeolite samples charged in the same manner.

EXAMPLE 3

Charged zeolite 13X was prepared as in Example 1. A 30 g sample of the charged zeolites was then placed in a semi rigid 50 ml polystyrene-polyethylene-EVOH laminate cup container and thermally sealed with a foil lid. The sealed zeolite cartridges were then placed into a sealed, metal cartridge chamber and pierced on the top and bottom.

Tap water was introduced at the bottom of the cartridge with the flow controlled by a solenoid valve. The solenoid valve was actuated via a pressure switch connected to the top gas outlet of the cartridge chamber. During three different tests, the pressure switch was set to three different operating pressures of 5, 22, and 35 psig. The resulting gas at the set pressures was then introduced into the shellside of a hydrophobic membrane contactor (1×5.5 Minimodule from Liquicel, of Charlotte, N.C.). The other shellside port was plugged to prevent gas from escaping. Water from a reservoir containing 400 ml of water and approximately 50 g of ice was circulated from the reservoir, through the contactor, and back to the reservoir (e.g., like that shown in FIG. 2) using an Ulka (Milan, Italy) type EAX 5 vibratory pump through the lumenside of the membrane contactor. The pressure of the reservoir and contactor was maintained at the same pressure as the gas was produced. The system produced gas and circulated the water for approximately 60 seconds before being stopped.

The resulting carbonated water was then tested for carbonation levels using a CarboQC from Anton-Paar of Ashland, Va. The results for are shown in the table below:

| System Pressure (psig) | Average Carbonation Level (Volumes $CO_2$ dissolved) |
| --- | --- |
| 10 | 1.35 |
| 22 | 2.53 |
| 35 | 3.46 |

Thus, the gas was shown to evolve from the zeolites in the cartridges at a controllable rate (based on water delivery to the cartridge chamber) and then dissolved into water to produce a carbonated beverage. In addition, this illustrates the concept that by controlling system pressures one can control the level of carbonation of the finished beverage. It is expected that higher system pressures, e.g., of about 40-50 psi above ambient, would produce a 4 volume carbonated beverage (having a liquid volume of about 500 ml) in about 60 seconds or less.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method for forming a beverage, comprising:
    placing a single cartridge, defining a sealed internal space with first and second chambers, into a cartridge chamber of a beverage forming machine, the first chamber containing a carbon dioxide source arranged to emit carbon dioxide gas for use in carbonating a precursor liquid, and the second chamber containing a beverage medium arranged to be mixed with a carbonated precursor liquid to form a beverage, the carbon dioxide source being in solid form and having adsorbed carbon dioxide, the first and second chambers being separated by an impermeable wall and isolated from each other inside the single cartridge;
    closing the cartridge chamber to hold the first chamber in a sealed space arranged to receive and hold carbon dioxide released from the first chamber under pressure;
    providing a fluid to the first chamber in the cartridge chamber to cause the carbon dioxide source to emit carbon dioxide for use in carbonating a precursor liquid, the step of providing a fluid to the first chamber in the cartridge chamber being performed by pumping fluid into the first chamber in the cartridge chamber to control a rate at which carbon dioxide is emitted by the carbon dioxide source;
    carbonating a precursor liquid by dissolving at least a portion of the carbon dioxide emitted from the carbon dioxide source into the precursor liquid, thus resulting in a carbonated precursor liquid;
    introducing pressurized gas into the second chamber while the single cartridge is held in the cartridge chamber to move the beverage medium out of the single cartridge; and
    mixing the carbonated precursor liquid with the beverage medium to produce a beverage.

2. The method of claim 1, wherein the carbon dioxide source is a carbon dioxide-charged molecular sieve.

3. The method of claim 2, wherein the carbon dioxide source is a carbon dioxide-charged zeolite.

4. The method of claim 1, wherein the step of carbonating includes providing carbon dioxide gas to a reservoir that contains precursor liquid.

5. The method of claim 1, wherein the step of carbonating includes providing carbon dioxide from the carbon dioxide source to a gas side of a membrane such that carbon dioxide on the gas side is dissolved in the precursor liquid on a liquid side of the membrane.

6. The method of claim 1, wherein the step of providing a fluid includes piercing the cartridge using the beverage forming machine to provide the fluid to the cartridge.

7. The method of claim 1, wherein the step of providing a fluid to the first chamber includes delivering fluid to the first chamber in multiple sequential volumes to control carbon dioxide gas production by the carbon dioxide source.

8. The method of claim 7, wherein the delivering of fluid to the first chamber comprises controlling an amount of the fluid provided to the first chamber to maintain a pressure of gas produced by the carbon dioxide source to be in a desired range above an ambient pressure.

9. The method of claim 7, wherein the carbon dioxide source includes a charged zeolite, and the delivering of fluid to the first chamber comprises controlling the fluid provided to the first chamber so as to cause the charged zeolite to emit carbon dioxide over a period of at least 30 seconds.

10. The method of claim 1, wherein the first and second chambers have a volume that is less than a volume of carbonated beverage to be formed using the cartridge portions.

11. The method of claim 1, wherein the steps of providing a fluid and carbonating are performed over a period of time less than about 120 seconds to form a carbonated liquid having a volume of between 100-1000 ml and a carbonation level of about 2 to 4 volumes.

12. The method of claim 1,
    wherein the step of introducing pressurized gas into the second chamber includes piercing the cartridge to form an opening through which the gas is introduced to pressurize the second chamber.

13. The method of claim 1, wherein the step of carbonating comprises:
    exposing the precursor liquid in a reservoir to carbon dioxide emitted by the carbon dioxide source.

14. The method of claim 13, further comprising cooling the precursor liquid while in the reservoir.

15. The method of claim 1, wherein the step of providing a fluid to the cartridge chamber comprises controlling an amount of carbon dioxide emitted by the carbon dioxide source to control an amount of carbon dioxide dissolved in the precursor liquid.

16. The method of claim 1, wherein the step of providing a fluid to the cartridge chamber includes,
    delivering a first amount of fluid to the first chamber in the cartridge chamber,
    stopping delivery of fluid to the first chamber, and
    delivering a second amount of fluid to the first chamber in response to a pressure of carbon dioxide emitted by the carbon dioxide source falling below a threshold value.

17. The method of claim 16, wherein the step of stopping delivery comprises stopping delivery of the first amount of fluid to the cartridge chamber in response to pressure of carbon dioxide emitted by the carbon dioxide source exceeding a value.

18. The method of claim 1, wherein the step of providing a fluid to the cartridge chamber includes,
    delivering fluid to the first chamber in the cartridge chamber to cause the carbon dioxide source to emit carbon dioxide for use in carbonating a precursor liquid,
    detecting a pressure of carbon dioxide emitted by the carbon dioxide source, and stopping delivery of fluid to the first chamber in the cartridge chamber based on the detected pressure.

* * * * *

UNITED STATES PATENT AND TRADEMARK OFFICE
CERTIFICATE OF CORRECTION

PATENT NO. : 8,808,775 B2  Page 1 of 1
APPLICATION NO. : 13/017459
DATED : August 19, 2014
INVENTOR(S) : Thomas J. Novak et al.

It is certified that error appears in the above-identified patent and that said Letters Patent is hereby corrected as shown below:

\*\*In the Specification:

At column 13, line 45, please correct the word "sniffing" to read as: -- -snifting--.\*\*

Signed and Sealed this
Twenty-first Day of October, 2014

Michelle K. Lee
*Deputy Director of the United States Patent and Trademark Office*